US012603918B2

(12) United States Patent
Melson et al.

(10) Patent No.: US 12,603,918 B2
(45) Date of Patent: *Apr. 14, 2026

(54) SECURITY SYSTEM FOR DETECTING MALICIOUS ACTOR'S OBSERVATION

(71) Applicant: Target Brands, Inc., Minneapolis, MN (US)

(72) Inventors: Paul Melson, Minneapolis, MN (US); Chris Carlson, Minneapolis, MN (US); Eric Brandel, Minneapolis, MN (US); Caleb Walch, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 310 days.

This patent is subject to a terminal disclaimer.

(21) Appl. No.: 18/477,658

(22) Filed: Sep. 29, 2023

(65) Prior Publication Data

US 2024/0022603 A1 Jan. 18, 2024

Related U.S. Application Data

(63) Continuation of application No. 17/341,589, filed on Jun. 8, 2021, now Pat. No. 11,811,824.

(60) Provisional application No. 63/036,204, filed on Jun. 8, 2020.

(51) Int. Cl.
*H04L 9/40* (2022.01)
(52) U.S. Cl.
CPC ............................... *H04L 63/1483* (2013.01)
(58) Field of Classification Search
CPC ................................................. H04L 63/1433
See application file for complete search history.

(56) References Cited

U.S. PATENT DOCUMENTS

| | | | |
|---|---|---|---|
| 8,176,556 B1 * | 5/2012 | Farrokh .............. | H04L 63/1483 |
| | | | 713/188 |
| 8,499,283 B2 | 7/2013 | Mony | |
| 8,789,178 B2 | 7/2014 | Kejriwal et al. | |
| 8,806,646 B1 * | 8/2014 | Daswani ............... | G06F 21/566 |
| | | | 713/168 |
| 8,850,570 B1 * | 9/2014 | Ramzan ................ | H04L 63/145 |
| | | | 713/188 |
| 8,984,632 B1 * | 3/2015 | Laffoon .............. | H04W 12/128 |
| | | | 726/22 |
| 9,009,834 B1 | 4/2015 | Ren et al. | |
| 9,038,184 B1 * | 5/2015 | Mann .................... | G06F 21/563 |
| | | | 726/24 |
| 9,154,364 B1 | 10/2015 | Daswani et al. | |
| 9,178,904 B1 * | 11/2015 | Gangadharan .......... | G06F 21/53 |
| 9,367,415 B1 | 6/2016 | Lachwani et al. | |

(Continued)

*Primary Examiner* — Khang Do
(74) *Attorney, Agent, or Firm* — Barnes & Thornburg LLP

(57) ABSTRACT

A website vulnerability test is performed by automatically checking that a website has not been compromised by malicious third party scripts. A system can test a dynamic behavior of a website that indicates a functional user flow through the website. A set of rules are applied against a log of dynamic behavior of the website, as well as static code of the website, to identify potential compromise by malicious scripts. Some rules can be configured for detecting modification of a third party script, or modified behavior of a third party script, in an attempt to detect security monitoring activity against the script and hide its presence from the security monitoring activity.

20 Claims, 13 Drawing Sheets

(56) References Cited

U.S. PATENT DOCUMENTS

| | | | | |
|---|---|---|---|---|
| 9,398,032 | B1* | 7/2016 | Wan | H04L 63/1416 |
| 9,923,916 | B1* | 3/2018 | McClintock | G06F 21/53 |
| 10,140,451 | B2 | 11/2018 | Xu et al. | |
| 10,586,045 | B2 | 3/2020 | Pyles et al. | |
| 10,880,322 | B1 | 12/2020 | Jakobsson et al. | |
| 11,019,096 | B2* | 5/2021 | Takata | G06F 8/72 |
| 11,082,438 | B2 | 8/2021 | Peinador et al. | |
| 11,089,055 | B1* | 8/2021 | Sadovyi | G06Q 20/085 |
| 11,444,970 | B2* | 9/2022 | Melson | H04L 67/75 |
| 11,451,565 | B2 | 9/2022 | Zhou et al. | |
| 11,595,436 | B2* | 2/2023 | Melson | H04L 63/1425 |
| 11,704,386 | B2 | 7/2023 | Suzani et al. | |
| 11,811,824 | B2* | 11/2023 | Melson | H04L 63/1483 |
| 2007/0174915 | A1 | 7/2007 | Gribble et al. | |
| 2010/0186088 | A1* | 7/2010 | Banerjee | H04L 63/1433 |
| | | | | 709/224 |
| 2011/0239294 | A1* | 9/2011 | Kim | G06F 21/563 |
| | | | | 726/22 |
| 2011/0283356 | A1* | 11/2011 | Fly | G06F 21/577 |
| | | | | 726/22 |
| 2011/0296244 | A1* | 12/2011 | Fu | G06F 11/3608 |
| | | | | 714/E11.029 |
| 2013/0263272 | A1* | 10/2013 | Banerjee | H04L 63/1483 |
| | | | | 726/25 |
| 2013/0275951 | A1 | 10/2013 | Dolby et al. | |
| 2014/0143872 | A1* | 5/2014 | Lee | H04L 63/1441 |
| | | | | 726/23 |
| 2014/0373087 | A1* | 12/2014 | Ciu | H04L 63/145 |
| | | | | 726/1 |
| 2016/0088015 | A1* | 3/2016 | Sivan | H04L 63/1466 |
| | | | | 726/23 |
| 2017/0195353 | A1 | 7/2017 | Taylor et al. | |
| 2018/0069880 | A1* | 3/2018 | Kupreev | H04L 63/1408 |
| 2018/0077184 | A1* | 3/2018 | Thom | H04L 63/10 |
| 2018/0103047 | A1 | 4/2018 | Turgeman et al. | |
| 2018/0191777 | A1* | 7/2018 | Volkov | G06F 21/51 |
| 2018/0198807 | A1 | 7/2018 | Johns et al. | |
| 2018/0239821 | A1* | 8/2018 | Summers, II | G06F 16/248 |
| 2019/0028497 | A1 | 1/2019 | Karabchevsky et al. | |
| 2019/0042736 | A1* | 2/2019 | Krebs | H04L 63/1491 |
| 2019/0156039 | A1 | 5/2019 | Harsany et al. | |
| 2019/0158535 | A1 | 5/2019 | Kedem et al. | |
| 2019/0163905 | A1* | 5/2019 | Woodworth | G06F 21/554 |
| 2019/0311132 | A1 | 10/2019 | Arnoth et al. | |
| 2019/0342328 | A1 | 11/2019 | Rivner et al. | |
| 2020/0014702 | A1* | 1/2020 | Dasgupta | G06F 21/45 |
| 2020/0076840 | A1 | 3/2020 | Peinador et al. | |
| 2020/0195694 | A1* | 6/2020 | Kalinin | G06Q 10/107 |
| 2020/0293592 | A1* | 9/2020 | Kumar | G06F 3/0481 |
| 2020/0356661 | A1* | 11/2020 | Stoletny | H04L 63/1466 |
| 2021/0075826 | A1* | 3/2021 | Johnson | H04L 67/02 |
| 2021/0092146 | A1* | 3/2021 | Melson | H04L 63/1433 |
| 2021/0194921 | A1* | 6/2021 | Guajardo Merchan | G06F 8/65 |
| 2021/0314353 | A1* | 10/2021 | Melson | H04L 67/02 |
| 2021/0344661 | A1* | 11/2021 | Krylov | H04L 67/535 |
| 2021/0385245 | A1* | 12/2021 | Melson | H04L 63/1483 |
| 2022/0030029 | A1* | 1/2022 | Kagan | H04L 63/1483 |
| 2022/0247773 | A1* | 8/2022 | Caithness | G06F 21/552 |
| 2024/0022603 | A1* | 1/2024 | Melson | H04L 63/1483 |

* cited by examiner

SECURITY SYSTEM FOR DETECTING MALICIOUS ACTOR'S OBSERVATION

CROSS-REFERENCE TO RELATED APPLICATIONS

This application is a continuation of U.S. patent application Ser. No. 17/341,589, filed Jun. 8, 2021, which claims the benefit of U.S. Provisional Application Ser. No. 63/036, 204, filed Jun. 8, 2020, the disclosures of which are incorporated herein by reference in their entirety.

TECHNICAL FIELD

This document generally describes technologies for a network security test of a network resource, such as websites.

BACKGROUND

A website vulnerability is a weakness or misconfiguration in website code that allows an attacker to breach one or more security mechanisms on the site, which can permit attackers to, for example, gain some level of control over or access to sensitive information on the site. There are several types of well-known website vulnerabilities that have been exploited by attackers, such as SQL injection vulnerabilities, cross-site scripting (XSS), command injection, file inclusion, and cross-site request forgery (CSRF). SQL injection vulnerabilities refer to areas in website code where direct input from a client device can be passed to a database. Bad actors utilize these forms to inject malicious code into a website's database, such as by injecting malicious/spam posts into a site, stealing customer information, or bypassing authentication to gain full control of the website. XSS occurs when attackers inject scripts through unsanitized user input or other fields on a website to execute code on the site. Browsers are unable to discern whether or not such cross-site scripts are intended to be part of the website, resulting in malicious actions being performed by cross-site scripts, such as session hijacking, spam content being distributed to unsuspecting visitors, and stealing session data. Command injection vulnerabilities allow attackers to remotely pass and execute code on the website's hosting server. File inclusion attacks use inclusion functions in server-side web application languages (e.g., PHP) to execute code from a remotely stored malicious file. CSRF attacks trick site users or administrators to unknowingly perform malicious actions for the attacker, such as changing order values and product prices, transferring funds from one account to another, or changing user passwords to hijack accounts.

Website administrators may manually analyze website code to identify vulnerabilities. For example, a website crawl and audit may be manually or automatically used to discover vulnerabilities by, for example, working statically with each link interacting with a server.

SUMMARY

The present disclosure generally relates to systems, methods, devices, and computer program products for network security tests, such as testing and verifying the security of websites. In particular, security threat detection, such as detecting malicious scripts that have been injected or otherwise loaded onto client devices as part of a website, can sometimes be compromised and thwarted by malicious actors who design the malicious code to detect when it is being observed so that it can change its behavior to avoid detection. For example, some malicious code has been designed to modify and/or delete logs that are used by software tools (e.g., development tools, debugging tools, etc.) to record and evaluate the operations that are performed by the application that the malicious code is acting upon—thwarting analysis of those logs and detection of the operation of the malicious code. In another example, some malicious code has been designed to detect pauses and/or other timing anomalies in the execution of an application that the malicious code is acting upon (the pauses and/or other timing anomalies, in some instances, resulting from the use of software tools to evaluate the operations performed) and, as a result, to modify its behavior (e.g., not perform its malicious operations when observed) when the pauses/timing anomalies are detected. Such malicious code features—modifying behavior and/or data on a computer when being observed—can thwart some detection techniques, which can result in security vulnerabilities persisting even after security analysis and threat detection techniques are performed.

The disclosed technology is generally directed to systems, methods, devices, and computer program products to provide robust security threat detection that is able to still detect malicious code (and/or other security threats) that attempts to avoid detection when being observed—essentially thwarting the malicious codes' attempts to thwart threat detection techniques. As described throughout this document, there are a variety of techniques for detecting malicious code (and/or other security threats) that have infiltrated a computer device, system, and/or network, such as identifying modification and/or absence of particular logs and/or other data artifacts generated during security threat detection operations, identifying binding events to timing events and/or other events that may be used by malicious actors to determine whether observation is ongoing, and/or other techniques. These techniques can be performed in a variety of contexts and architectures, such as being performed as part of a website threat detection platform that tests websites as they would be rendered on a client device, using a variety of rules and techniques to determine whether malicious code (e.g., third party scripts or other types of scripts as described herein) are being loaded with and/or otherwise injected into the website code.

For example, the technologies described herein provide a system for automatically checking and detecting whether a website has been compromised by malicious third party scripts based on a set of rules. The rules are predetermined and can be applied against the static code of the website, and further against a log generated by dynamic real-time testing of a website (e.g., detecting a functional user flow through a website), to expose vulnerabilities from malicious code that have been secretly injected into trusted libraries on the website. In some implementations, website code can be loaded and evaluated in a runtime testing environment on a client computing device, which can simulate user processes on the website, including potentially sensitive functional user flows like purchasing items in an online store, logging in to a user account, and accessing private account information. Such a runtime testing environment can capture and record the dynamic behavior of the website during these functional user flows on the website, and apply rules against the record of dynamic behavior of the website to detect the potential presence of malicious code.

The technologies herein provide one or more rules and checks that are performed by a network security test system to determine whether a potential security vulnerability exists. The network security test system can apply such rules
and checks against the website being dynamically scanned
and logged, and/or against the static code of the website, and
identify any malicious indicators and determine whether a
potential security vulnerability exists. For example, the rules
can be configured to determine whether a piece of code is
observing whether the website is being tested to identify
malicious actors.

In some implementations, the rules are to determine
whether a script modifies its behavior in response to moni-
toring activities performed against the script or against the
website embedding the script. To put it simply, the rule is
designed to detect whether code watches a security tool
watching the source code. For example, some (malicious)
scripts can change their behavior in response to determining
that they are in a debug type environment. By way of
example, malicious code can detect a debugger which stops
and restarts the execution for a longer-than-typical period of
time, then the code may determine that it is being monitored.
The technologies described herein can thwart and detect
these malicious pieces of code that are attempting to do an
end-run around website scanning techniques for security
purposes.

For example, a malicious script may be designed to be
able to modify the functionality in such a way that console
logging is disabled. The objective is to be able to detect the
presence of console reassignment, which may result in the
disabling of the console logging. The technologies herein
can detect the absence of normal script logging which
suggests the presence of malicious code.

In addition, a malicious script may be designed to be able
to make it difficult for development tools to analyze the
webpage code by affecting the operation of the browser. For
example, a malicious script can be configured to react to
source code analysis by generating a series of arrays that
may cause the browser to slow down or crash. The tech-
nologies herein can detect such change in browser operation
and alert security monitors of the presence of malicious
activity.

In addition, the technologies described herein can also be
used to automatically check and detect whether a website
has been compromised by other types of malicious scripts
such as inline scripts and first party scripts. For example,
inline scripts includes scripts written in an <script> block
within the webpage that is loaded. First party scripts include
scripts that are included in separate files (e.g., .js files) and
located on the same domain name as the webpage. Third
party scripts include scripts that are included in separate files
(e.g., .js files) and located on another domain.

For example, malicious first party scripts can appear on a
website in various scenarios, and the technologies described
herein can test and identify such malicious first party scripts
in the same or similar manner as they do for malicious third
party scripts. In one scenario, malicious first party scripts
can appear on a target website through supply chain attacks.
For example, an attacker compromises a script that can be
used on sensitive pages (e.g., checkout page). The compro-
mised script may be added to various online repositories
(e.g., Npm™, Bower™, etc.), and pulled into a build process
for the website automatically. In another scenario, a mali-
cious first party script can appear on a website if an external
entity has compromised the system that manages the web-
site. For example, a malicious code may be placed directly
onto the website, thereby ending up being a first party script.
In yet another scenario, a malicious code may be added to
the website by a malicious insider.

Particular embodiments described herein include a
method for testing a website vulnerability. The method may
include retrieving website code of a website, the website
code including a script; executing the website code with
automation script, the automation script simulating a user
interaction with the website; accessing a console log; search-
ing for an indicator of malicious action in the console log;
determining presence of a potential malicious script based
on the indicator; and returning an alert of the presence of the
potential malicious script in the website.

In some implementations, the system can optionally
include one or more of the following features. The script
may include one or more messages that are recorded in the
console log as the script is executed. Retrieving website
code may include retrieving website code on a browser. The
method may include running a code evaluation tool on the
browser. The code evaluation tool may be built in the
browser. The code evaluation tool may be configured to
insert the messages in the script prior to the execution. The
indicator may be indicative of the console log being empty.
The indicator may be indicative of the console log without
the messages. The indicator may be indicative of the console
log being modified. The indicator may be indicative of the
console log with the messages being modified.

Particular embodiments described herein include a
method for testing a website vulnerability. The method may
include retrieving website code of a website, the website
code including a script; debugging the website code; search-
ing for an indicator of malicious action during the debug-
ging; determining presence of a potential malicious script
based on the indicator; and returning an alert of the presence
of the potential malicious script in the website.

In some implementations, the system can optionally
include one or more of the following features. Retrieving
website code may include retrieving website code on a
browser. The method may include running a code evaluation
tool on the browser. The indicator may be indicative of
binding events to timing events. The indicator may be
indicative of accessing event calls for timing-related func-
tions. The indicator may be indicative of binding events to
start and stop timings of an operation.

Particular embodiments described herein include a client
computing device for testing a website vulnerability. The
client computing device may include a data processing
apparatus and a memory device storing instructions that
when executed by the data processing apparatus cause the
device to perform operations. The operations may include
retrieving website code of a website on a browser, the
website code including a script; executing the website code
with automation script, the automation script simulating a
user interaction with the website; running a code evaluation
tool on the browser; accessing a console log; searching for
an indicator of malicious action in the console log; deter-
mining presence of a potential malicious script based on the
indicator; and returning an alert of the presence of the
potential malicious script in the website.

In some implementations, the system can optionally
include one or more of the following features. The script
may include one or more messages that are recorded in the
console log as the script is executed. The code evaluation
tool may be configured to insert messages in the script prior
to the execution. The indicator may be indicative of the
console log being empty or modified.

Particular embodiments described herein include a client
computing device for testing a website vulnerability. The
client computing device may include a data processing
apparatus and a memory device storing instructions that when executed by the data processing apparatus cause the device to perform operations. The operations may include retrieving website code of a website on a browser, the website code including a script; running a code evaluation tool on the browser; debugging the website code; searching for an indicator of malicious action during the debugging; determining presence of a potential malicious script based on the indicator; and returning an alert of the presence of the potential malicious script in the website.

In some implementations, the system can optionally include one or more of the following features. The indicator may be indicative of at least one of binding events to timing events; accessing event calls for timing-related functions; and binding events to start and stop timings of an operation.

The devices, system, and techniques described herein may provide one or more of the following advantages. For example, some embodiments described herein include a system that automates dynamic testing of a functional user flow through a website (e.g., a checkout page) to expose vulnerabilities from third party scripts. Therefore, the system can reveal suspicious behavior on a website resulting from malicious scripts that have been secretly injected into trusted libraries on the website in a way that is not apparent from static analysis (e.g., due to obfuscation of the code). Such identification of malicious third party scripts affecting a website may otherwise not be possible, and may be a point of uncertainty for website owners and managers regarding website security. The disclosed technology can assist in verifying that a website is free of such malicious code, and can also aid in detecting potential threat vectors when they exist.

In another example, the network security system can permit automation scripts to be generated and run with website code in an isolated environment. Further, such automation scripts can simulate dynamic behavior of the website as if a user interacts with the checkout page or other secured pages on the website. Therefore, security analysis of a website can be performed without affecting actual client devices that interact with the website.

In another example, the system herein can log the dynamic behavior of the website, and generate a report that can be used to identify vulnerabilities on the website. The log can be used as a reliable source to identify anomalies in the behavior of the website that can result from malicious code on the website. The reports can be used for further investigation of the vulnerabilities of the website.

In another example, the system herein can perform further attribution against scripts (e.g., first party scripts, third party scripts, etc.) by analyzing the log data. Some examples of behavior captured in the logs include dynamically loading additional scripts, adding third-party trackers, listening and recording keyboard events, adding or modifying elements on the webpage, and creating HTML elements that make network requests to third-party servers.

In another example, the static website code and/or the log of website dynamic behavior are examined based on a collection of rules. The rules are configured to screen potential malicious actors quickly, thereby enabling further manual or automated security investigation to be performed with more focused approach and in time and cost efficient manners.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

In general, the technology described herein relates to one or more rules for determining whether a third party script is observing whether a security test is being performed to identify potentially malicious behaviors in the website. These rules can be used independently, or in combination with other rules that may be applied against the website being tested. Such other rules can be configured to examine the source code itself by detecting indicators (e.g., strings or code snippets) in the website code that represent presence of obfuscation techniques, encryption libraries, masking techniques (e.g., jQuery Mask), and sensitive information requests in the website code. Such presence can indicate that malicious scripts are likely included in the website code, and further investigation may be required. In addition or alternatively, the rules can be configured to examine the dynamic behavior log, which is created during the dynamic website test in runtime environments, by looking at network traffic in the log and searching for known bad actors (e.g., scripts, domains, etc.) and/or unknown actors (e.g., scripts, domains, etc.) that have interacted with the website. Presence of known bad actors or unknown actors can be used as indicators for presence of malicious code, for which further investigation may be needed. In addition or alternatively, the rules can be configured to examine the dynamic behavior log by detecting indicators that can represent whether sensitive information (e.g., payment data, credentials, etc.) is requested and transmitted outside the website (e.g., to bad domains), whether content security policies (e.g., security policies implemented in browsers) are bypassed, whether information entered in sensitive information fields is intercepted, and/or whether script behavior is modified in the website when the website is being observed (as described primarily herein). Presence of such indicators from the dynamic behavior log can be used as indicators for presence of malicious code, for which further investigation may be needed.

Figure 1:
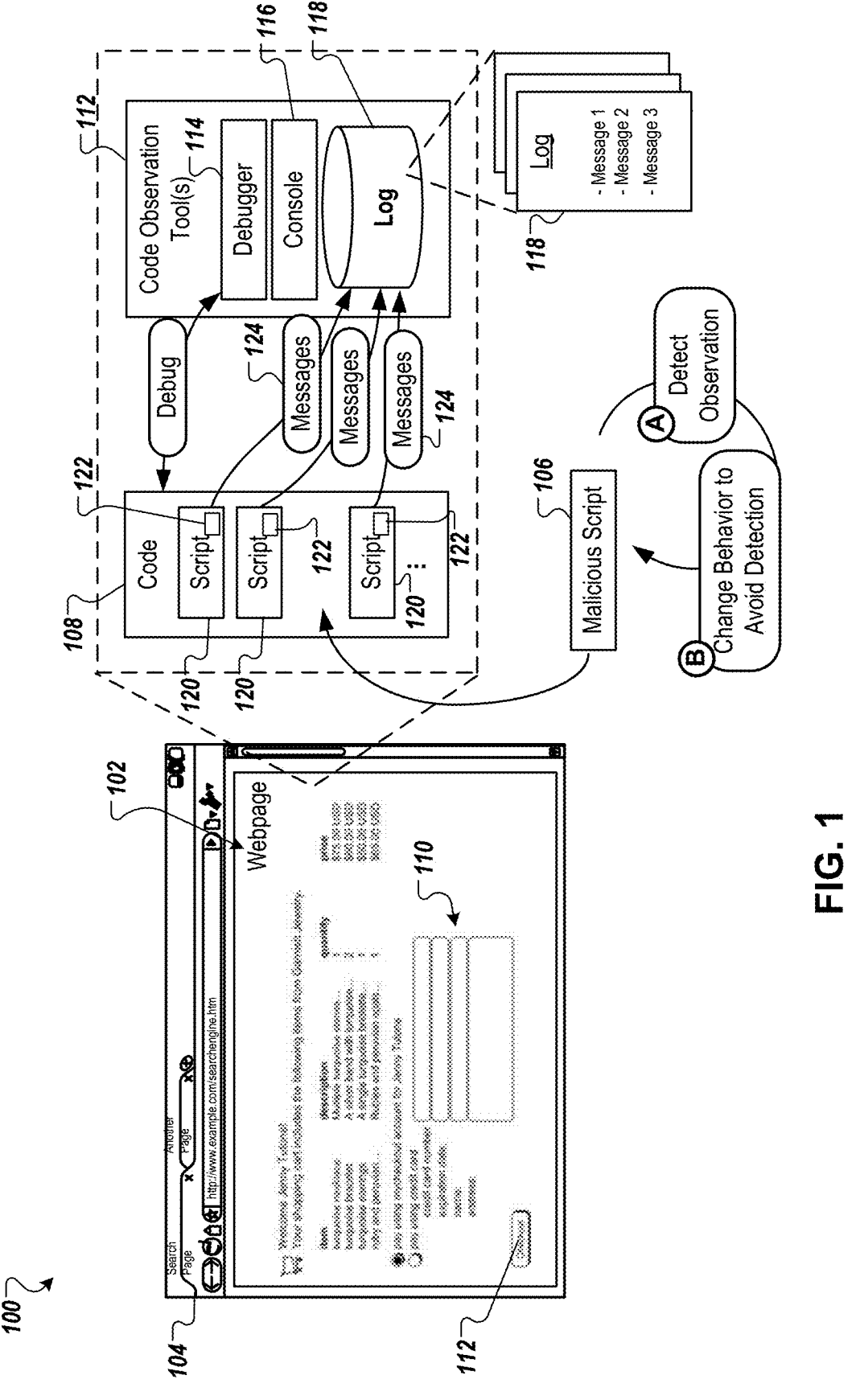
FIG. 1 illustrates an example technique for malicious code to avoid being detected in response to evaluating website security.

FIG. 1 illustrates an example technique 100 for malicious code to avoid being detected in response to evaluating website security. For example, when a webpage 102 can be loaded in a browser 104, malicious code 106 that has been secretly injected into website code 108 can take actions to collect sensitive information from the webpage 102. In some implementations, the webpage 102 loaded in the browser 104 can include field 110 for receiving a user input of sensitive information, such as user credentials, payment information, etc. For example, the webpage code 108 can be run in the webpage 102 to bind to events to the sensitive information fields 110. Event binding refers to telling the browser that a particular function should be called when a particular event occurs. Such a particular event may relate to a user input, such as a click on a button. Malicious code 106 can use such event binding to intercept the user input from the sensitive information fields as the user enters the information to the fields. Examples of the webpage 102 include checkout pages, login pages, user profile pages, and other pages that require user inputs of sensitive information. Examples of sensitive information that can be entered on such webpages include credit card number, expiration, card validation digit (CVD), card pin, card name, address, zip code, etc. The webpage 102 can further include a button 112 (e.g., clickable button) for submitting the information filled in the fields 110.

One or more code observation tools 112 can be provided to edit webpage code and/or diagnose problems with the webpage. The code observation tools 112 can be built into the browser 104. Alternatively, the code observation tools 112 can be provided separately and executed against the website code loaded on the browser.

In some implementations, the code observation tools 112 can include development tools (or developer tools or DevTools), which are programs that allow a developer to test and debug software. Such development tools can be integrated with browsers and enable developers to inspect and debug webpage code (including HTML, CSS, DOM, JavaScript, etc.) and further inspect the network traffic it causes. For example, the code observation tools 112 can include a HTML viewer and/or editor that allows a user to see the HTML as it was rendered, and further allows the user to make changes to the HTML and see the change reflected in the page after the change is made. In addition to selecting and editing, the HTML viewer and/or editor can include HTML elements panels that display properties of the DOM, such as display dimension and CSS properties. The code observation tools 112 can also allow developers to inspect webpage sources that are loaded and available on a webpage as the webpage load and require additional content in the form of images, scripts, font, and other external files. In addition, the code observation tools 112 can include profiling and auditing functionalities for capturing information about the performance of a webpage or web application. The collected information can be used to improve the performance of the source code. Auditing features can be configured to provide developers suggestions, after analyzing a webpage, for optimizations to decrease page load time and increase responsiveness. The code observation tools 112 can include timeline features that provide a record of the time it takes to render the page, memory usage, and the types of events which are taking place.

Further, the code observation tools 112 can include a debugging tool 114 for debugging scripts. For example, the debugging tool 115 can allow developers to add watch expressions, breakpoints, view the call stack, and pause, step over, step into, and step out of functions while debugging scripts.

In some implementations, the code observation tools 112 can include a script console 116 (e.g., JavaScript console), which enables a developer to type in script commands and call functions, and/or view errors that may have been encountered during the execution of a script.

In some implementations, the script console 116 can permit users (e.g., developers, security analysts, etc.) to log messages to make sure that the scripts 120 in the webpage code 108 are working as expected. For example, log requests 122 (e.g., "console.log('[message]')") can be inserted into a script 120 to log messages 124. When the browser 104 executes the script 120 and sees the log requests 122, the messages 124 associated with the log requests 122 can be recorded in a log 118. The log 118 can include one or more messages 124 identified in a script 120 while the script 120 is executed. The script console 116 can be configured and used to retrieve the messages 124 in the log 118 to ensure that the webpage code 108 is executing as expected (e.g., in the right order), and/or inspect the values of variables at certain moment in time. For example, the script console 116 can output (e.g., display) the messages 124 so that a user can analyze the behavior and/or performance of the script based on the messages 124. Further, the script console 116 can be configured and used to evaluate the messages 124 and identify malicious actions with the webpage code 108.

In addition, the script console 116 can be used to run scripts in the console 116 to interact with the webpage 102 being inspected. The script console 116 can also be configured to permit for users to modify the webpage from the console.

The malicious script 106 can be injected into the webpage code 108 and designed to take actions to avoid being detected when the webpage code 108 is observed or tested. Such observation or testing of the code 108 may lead to identification of the malicious script 106, or suggest presence of the malicious script 106, in the code. Therefore, the malicious script 106 can be configured to detect the webpage code 108 is being observed (Step A), and change its behaviors to prevent itself from being detected (Step B). In some implementations, the malicious script 106 can detect whether the code observation tools 112 have been opened and run, and determine the webpage code 108 is observed based on such detection. When the webpage code 108 is determined to be observed, the malicious script 106 can modify its behaviors in the code to hide itself from the code observation or testing, and/or take certain actions to continue to perform, or complete malicious activities (e.g., collecting sensitive information), in a short period of time or until the malicious script 106 ends up being identified.

Figure 2:
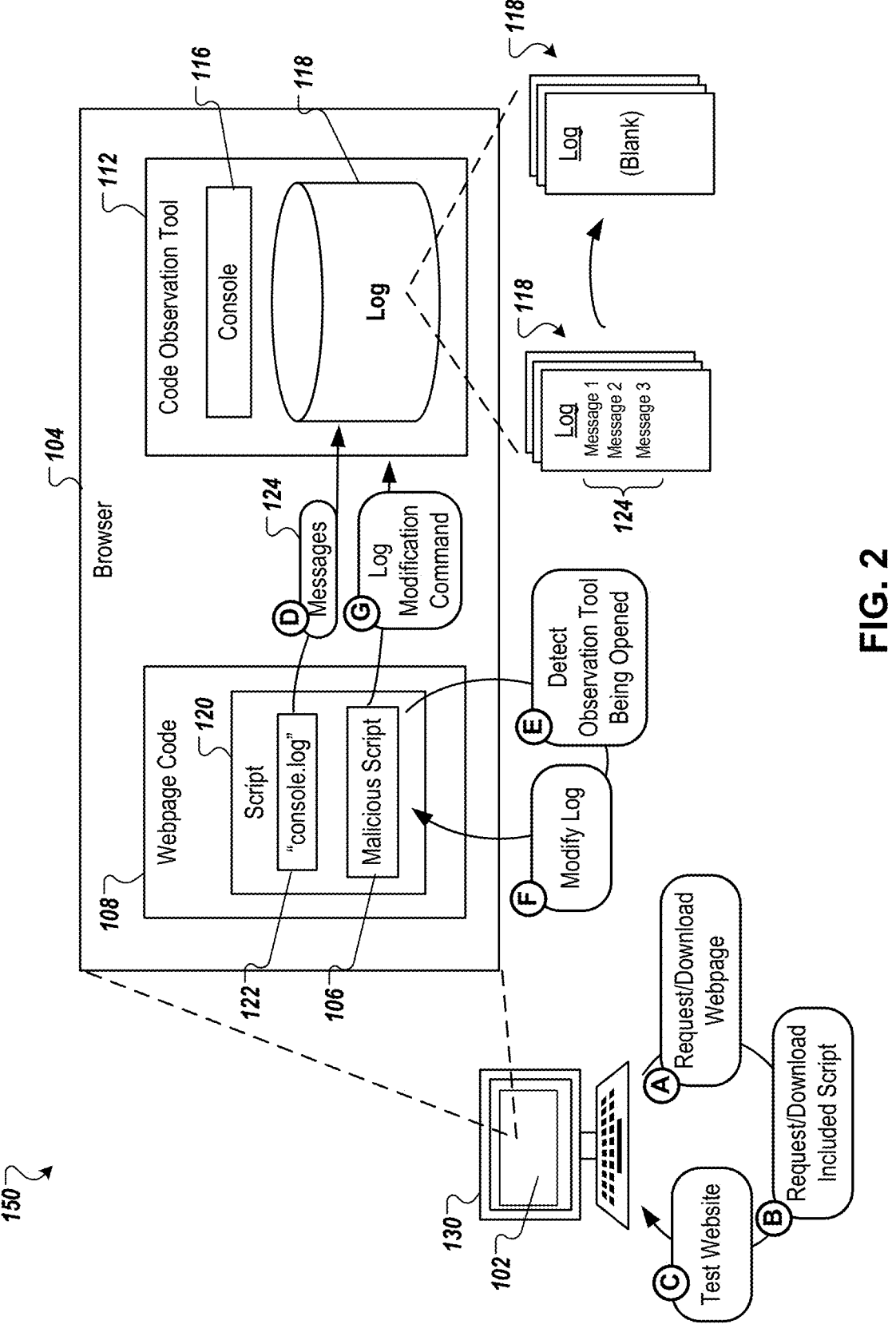
FIG. 2 illustrates an example technique for malicious script to hide its presence in a webpage being tested.

FIG. 2 illustrates an example technique 200 for malicious script 106 to hide its presence in a webpage 102 being tested. The webpage 102 can be tested for security purposes, such as to expose vulnerabilities from third party scripts that have been secretly injected into trusted third party libraries on the website. For example, the webpage 102 can be tested to detect whether it has been compromised by malicious scripts based on one or more rules that can be applied against the static code of the webpage, and/or against a log generated by dynamic real-time testing of a website (e.g., detecting a functional user flow through a website).

A test client device 130 can operate to test the webpage 102. For example, the test client device 130 can request and download the webpages (Step A), and further to request and download the third party scripts and resources included in the webpages (Step D). In Step C, the test client device 130 can transmit a request for the webpage 102 to a web server. The web server transmits the requested webpage 102 to the test client device 130, and the test client device 130 downloads the webpage 102 from the web server. In Step D, the test client device 130 can transmit a request for the third party scripts (e.g., at least some of the scripts 120) included in the webpage 102 to third party script servers, which then transmits the requested third party scripts back to the test client device 130. The test client device 130 downloads the third party scripts from the third party script servers.

The test client device 130 can perform a test on the website (including the webpage 102) (Step C). In some implementations, website code can be loaded and evaluated in a testing environment on the test client device 130, which can simulate user processes on the website, such as potentially sensitive functional user flows like purchasing items in an online store, logging in to a user account, and accessing private account information. Such a testing environment can capture and record the dynamic behavior of the website during these functional user flows on the website, and apply rules against the record of dynamic behavior of the website to detect the potential presence of malicious third party scripts. For example, during the testing process, the webpage 102 including a script 120 (and the malicious script 106) can be accessed and presented with a website test wrapper, which can execute an automation script. The automation script provides simulated user inputs to interact with the webpage 102. The website test wrapper can generate a dynamic website log that records all the behavior of the webpage 102 in response to the simulated user inputs provided by the automation script.

As the test client device 130 runs the webpage code 108, the messages 124 included in the script 120 can be logged (Step D). For example, as the script 120 in the webpage code is executed, the messages 124 associated with the script 120 are recorded in the log 118. In some implementations, the messages 124 have been included in the script 120 to track the script 120 is working as coded, and/or modify the script 120 for improvement. The log 118 can include the messages 124 identified in the script 120 as the script 120 is run.

In some implementations, the script console 116 can be configured to output the logged messages 124 to enable users (e.g., developers, analysts, etc.) to evaluate the behavior of the script 120 and ensure the script 120 has been performed as intended. For example, the script console 116 can provide an interface (e.g., panel in the browser) to display the logged messages 124 so that users can review them and determine the script 120 has behaved in the intended manner (e.g., in the intended order, interacting with other part of the code as expected, within an expected time, etc.).

Referring to FIG. 2, the malicious script 106 can be designed to hide itself or its activities during the testing of the webpage 120 when malicious script 106 detects it is being observed. For example, the malicious script 106 can be configured to detect a code observation tool (e.g., the code observation tools 112) is open to evaluate or test the webpage code 108 into which the malicious script 106 has been injected (Step E). As described herein, some examples of the code observation tools 112 can be development tools built in the browser 104. The malicious script 106 may detect the running of the code observation tools 112 in various ways. For example, the malicious script 106 can determine that the code observation tools 112 are open by detecting a predetermined size of panel is open in the browser 104, which corresponds to a typical size of the panel for the code observation tools 112 (e.g., the built-in development tools) when they are open in the browser 104.

In the meantime, the malicious script 106 can perform its intended malicious actions, such as collecting sensitive information such as information entered by a user on the webpage 102 (Step F), and transmit the collected information to a malicious server or other computing devices intended by the malicious script (Step G).

When the code observation tools 112 are detected to be opened, the malicious script 106 can modify the log 118, in an attempt to hide the malicious actions that have been taken by the malicious script 160 and have been logged using the messages 124 associated with the script 120 to which the malicious script 106 has been secretly injected (Step H). Accordingly, a log modification command is transmitted to the code observation tools 112 and enables the code observation tools 112 (e.g., the console 116) to modify the messages 124 in the log 118 (Step I). In some implementations, the malicious script 106 can delete all the messages 124 from the log 118. In this case, when the script console 116 retrieves the log 118, it outputs no message (e.g., blank or no content), thereby indicating unauthorized or unexpected access and modification has been made to the log 118, which would not happen with benign scripts (e.g., the script 120 without malicious script) being executed as intended. In other implementations, the malicious script 106 can selectively delete some of the messages 124 in the log 118, and/or modify at least one of the messages 124, in such a way that the presence of the malicious script 106 is not revealed by investigating the log 118.

Figure 3:
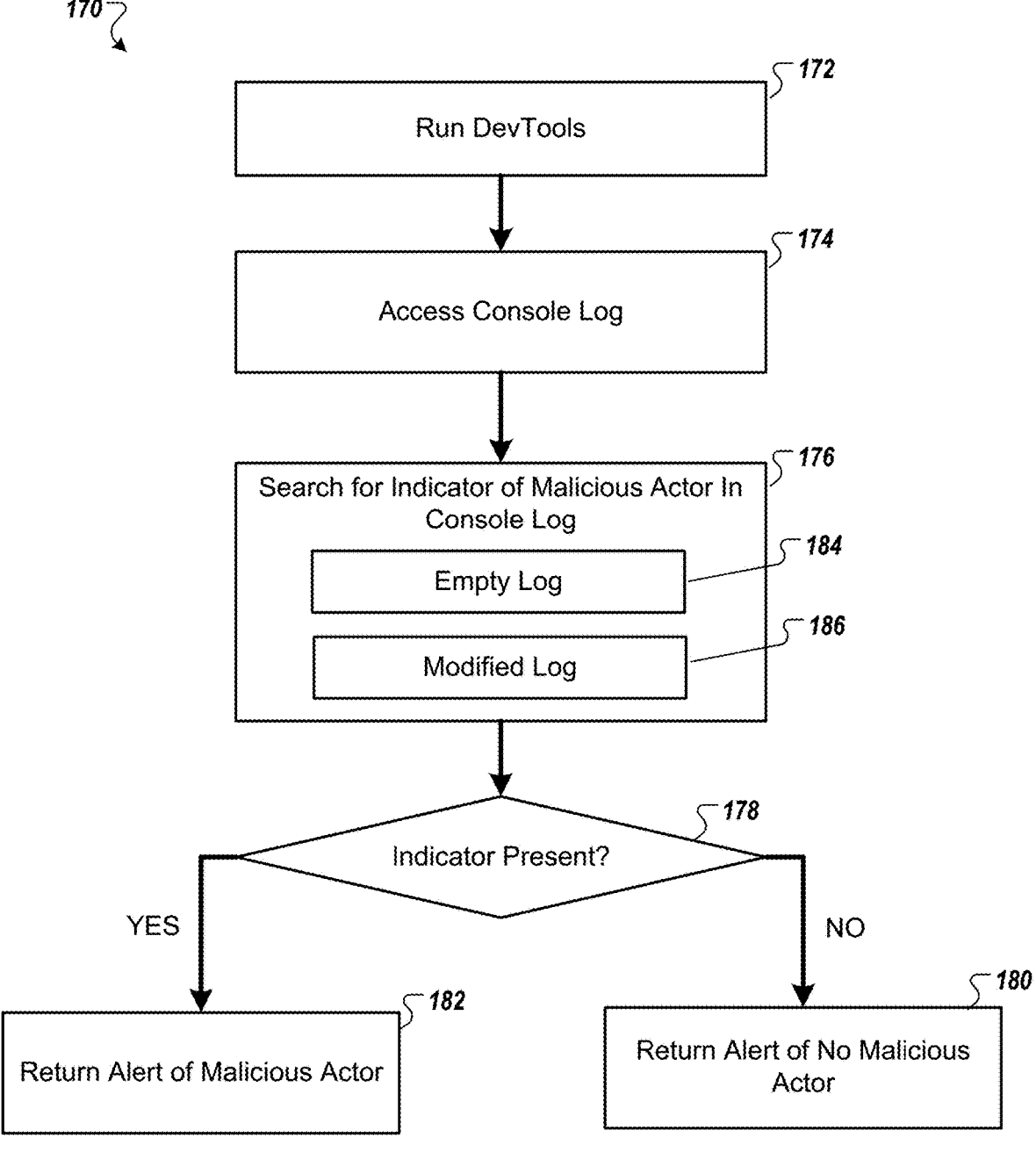
FIG. 3 is a flowchart of an example process for evaluating a website security based on detection of malicious script's observing action.

FIG. 3 is a flowchart of an example process 170 for evaluating a website security based on detection of malicious script's observing action. The process 170 is configured to detect that a malicious script, which has been secretly injected into website code, is observing that the website code is being tested (or the malicious script is being observed) in an attempt to hide its operation from being detected. In some implementations, the process 170 can be at least partially performed against static webpage code. In addition or alternatively, the process 170 can be at least partially performed against a dynamic behavior log as described herein, for example with reference to FIGS. 6-8.

In some implementations, a malicious script can be designed to be able to disrupt and/or disable script logging (e.g., the log 118 in such a way that users (e.g., developers, analysts, etc.) cannot identify the malicious script and its behaviors and actions. In some examples, the malicious script can erase the console. Therefore, the security testing system can detect the absence of normal script logging, which suggests the presence of malicious code.

Alternatively or in addition, a malicious script can be designed to be able to redefine a console (e.g., the script console 116) in such a way that users cannot identify the malicious script and its behaviors and actions. In some examples, the malicious script can make the console log non-supporting. If the console log is determined to be non-supporting, the security testing system can determine that a malicious actor is present in the code.

Referring to FIG. 3, the process 170 can include running one or more development tools, such as the code observation tools 112 (Block 172). The development tools can be built in a browser and opened in the form of a panel within the browser. The development tools can be used to test and debug the webpage code including scripts therein (including malicious scripts being injected), and/or inspect network traffic from and into the webpage. For example, the code observation tools 112 can provide a console panel that can be open to permit for a user to view logged messages or run scripts.

The process 170 can include accessing a console log, such as the log 118 (Block 174). The console log is supposed to log messages which have been included in the scripts and identified as the scripts are executed. Such logged messages can be reviewed or analyzed to ensure that the scripts in the webpage code perform as written, and/or inspect the values of variables at predetermined moments in time during execution. In some implementations, the development tools (e.g., a console) can output (e.g., display) the console log to enable a user to review the logged messages and thus analyze the behavior and/or performance of the scripts based on the messages.

The process 170 can include searching for one or more indicators in the console log that may represent a malicious actor attempting to avoid detection when being observed (Block 176). In one example, an empty console log can be an indicator of a malicious actor (Block 184). The malicious script can remove all the messages recorded in the console log during normal execution of the scripts, in an attempt to hide the behavior of the malicious script. An empty console log does not generally occur because benign scripts contain console log requests for logging certain messages during execution for testing and debugging purposes.

In another example, a modified console log can be an indicator of a malicious actor (Block 186). In some implementations, the malicious script can selectively delete some of the messages in the console log in an attempt to hide presence of the malicious script. In addition or alternatively, the malicious script can modify at least one of the messages in the console log in such a way that the presence of the malicious script is not revealed from the console log.

The process 170 can include determining whether the indicator is present in the console log (Block 178). If the indicator is not present ("No" in block 178), the process 170 returns an indicator of no malicious actor (e.g., script) (Block 180). Alternatively, the process 170 can simply end without returning any indicator, signal, or the like, if there is no such indicator present. If the indicator is present ("Yes" in block 178), the process 170 returns an indicator of presence of such an indicator of malicious actor (Block 182). This indicator can be provided in various forms, such as an alert, notification, message, etc., and can be transmitted to one or more security analysts via their computing devices. The indicator can be aggregated with other indicators described herein, and the aggregate of indicators can be provided to the security analysts via the computing devices or systems, so that the security analysts can perform further investigation.

Figure 4:
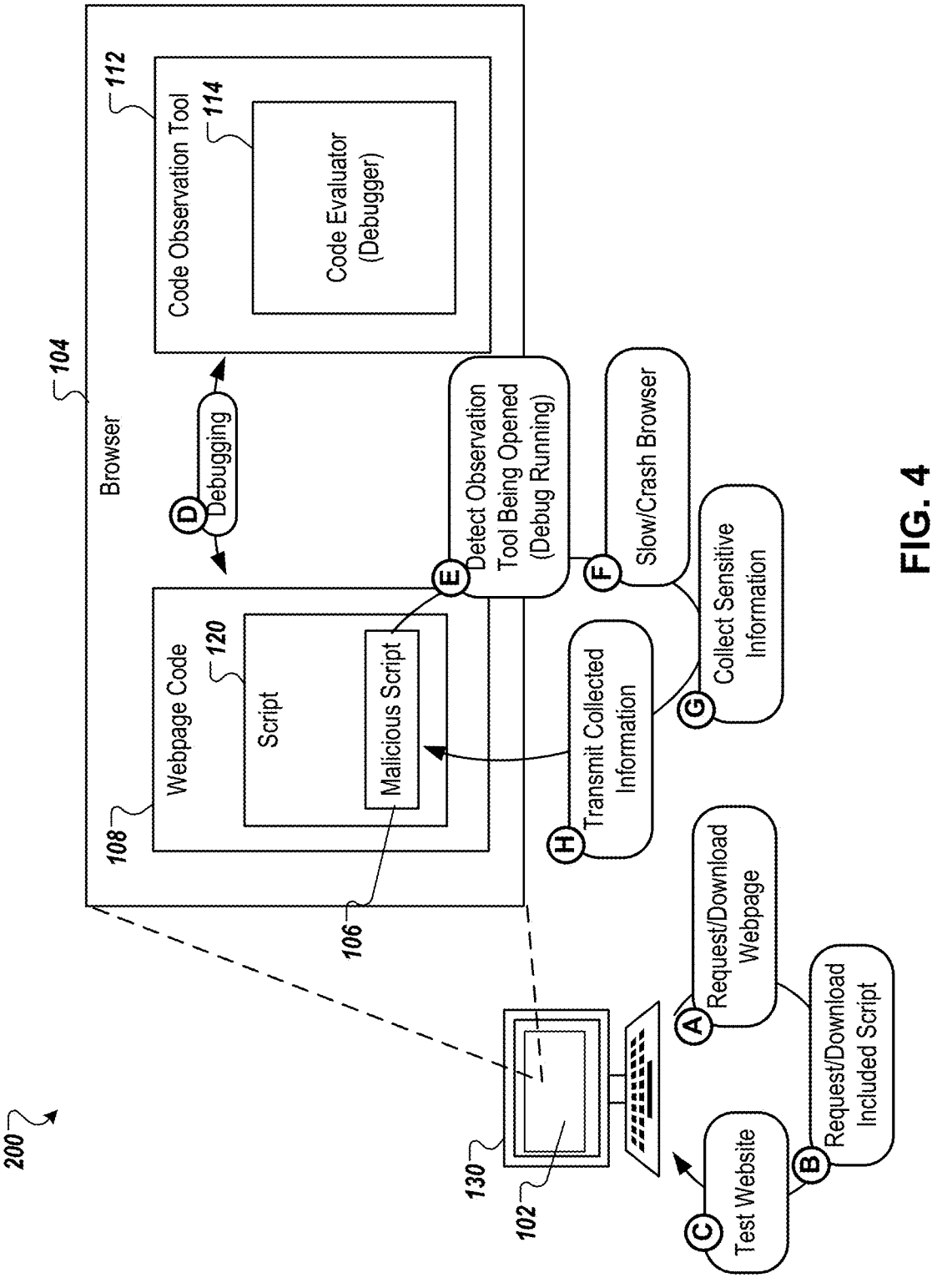
FIG. 4 illustrates an example technique for malicious script to hide its presence in a webpage being tested.

FIG. 4 illustrates an example technique 200 for malicious script 106 to hide its presence in a webpage 102 being tested. The webpage 102 can be tested for security purposes, such as to expose vulnerabilities from scripts that have been secretly injected into trusted libraries on the website. For example, the webpage 102 can be tested to detect whether it has been compromised by malicious scripts based on one or more rules that can be applied against a static code of the webpage, and/or against a log generated by dynamic real-time testing of a website (e.g., detecting a functional user flow through a website).

A test client device 130 can operate to test the webpage 102. For example, the test client device 130 can request and download the webpages (Step A), and further to request and download the scripts and resources included in the webpages (Step D). In Step C, the test client device 130 can transmit a request for the webpage 102 to a web server. The web server transmits the requested webpage 102 to the test client device 130, and the test client device 130 downloads the webpage 102 from the web server. In Step D, the test client device 130 can transmit a request for the third party scripts (e.g., at least some of the scripts 120) included in the webpage 102 to third party script servers, which then transmits the requested third party scripts back to the test client device 130. The test client device 130 downloads the third party scripts from the third party script servers.

The test client device 130 can perform a test on the website (including the webpage 102) (Step C). In some implementations, website code can be loaded and evaluated in a testing environment on the test client device 130, which can simulate user processes on the website, such as potentially sensitive functional user flows like purchasing items in an online store, logging in to a user account, and accessing private account information. Such a testing environment can capture and record the dynamic behavior of the website during these functional user flows on the website, and apply rules against the record of dynamic behavior of the website to detect the potential presence of malicious third party scripts. For example, during the testing process, the webpage 102 including a script 120 (and the malicious script 106) can be accessed and presented with a website test wrapper, which can execute an automation script. The automation script provides simulated user inputs to interact with the webpage 102. The website test wrapper can generate a dynamic website log that records all the behavior of the webpage 102 in response to the simulated user inputs provided by the automation script.

The code observation tools 112 can include a debugging tool 114 used to debug the webpage code 108 (Step D). The debugging tool 114 is configured to find and/or resolve defects or problems within webpage code. The debugging tool 114 can be used together with the console 116 to examine webpage code. Alternatively, the debugging tool 114 can be used instead of the console 116. The debugging tool 114 can be used to perform several actions. For example, the debugging tool 114 can be used to reproduce bugs (e.g., find a series of actions that consistently causes the bugs to appear). In addition, the debugging tool 114 can be used to pause the code in the middle of its execution and examine the values of all variables at that moment in time. Further, the debugging tool 114 can be used to step through the code's execution, one line at a time for example, and figure out where it's executing in a different order than expected. Moreover, the debugging tool 114 can be used to insert a line-of-code breakpoint to a specific line of code that may be desired to pause on. The debugging tool 114 can be used to monitor how values of variables or script expressions change over time. In addition, the debugging tool 114 can be used to fix the bug by editing the code and re-running the demo.

As described herein, the malicious script 106 is designed to perform malicious actions as intended, such as collecting sensitive information such as information entered by a user on the webpage 102 (Step E), and transmit the collected information to a malicious server or other computing devices intended by the malicious script (Step F).

Referring still to FIG. 4, the malicious script 106 can be designed to hide itself or its activities during the testing of the webpage 120 when the malicious script 106 detects it is being observed. For example, the malicious script 106 can be configured to detect a code observation tool (e.g., the code observation tools 112) is open to evaluate or test the webpage code 108 into which the malicious script 106 has been injected (Step G). As described herein, some examples of the code observation tools 112 can be development tools built in the browser 104. The malicious script 106 may detect the running of the code observation tools 112 in various ways. For example, the malicious script 106 can determine that the code observation tools 112 are open by detecting a predetermined size of panel is open in the browser 104, which corresponds to a typical size of the panel for the code observation tools 112 (e.g., the built-in development tools) when they are open in the browser 104.

In some implementations, the malicious script 106 may detect the debugging is taking place. For example, if the malicious script 106 detects a debugger which stops and restarts the execution for a longer-than-typical period of time, then the malicious script 106 may determine that it is being monitored. In some examples, the malicious script 106 can detect pauses and/or other timing anomalies in the execution of the webpage code that the malicious script code is acting upon, and can similarly detect pauses and/or other timing anomalies resulting from the use of debugger. The malicious script 106 can perform such detection by identifying binding events to debugging-related events, such as timing events and/or other events that may be used by the malicious script to determine whether observation is ongoing, and/or other techniques. Then, the malicious script 106 can modify its behavior (e.g., not perform its malicious operations when observed) when the pauses/timing anomalies are detected. Such malicious code features— modifying behavior and/or data on a computer when being observed— can thwart some detection techniques, which can result in security vulnerabilities persisting even after security analysis and threat detection techniques are performed.

When the code observation tools 112 are detected to be opened (and/or the debugging is detected to run), the malicious script 106 can at least partially stop its intended actions, in an attempt to hide its malicious activities from being detected (Step H). For example, the malicious script 106 can stop collecting sensitive information (in Step G), and transmitting the collected information to a malicious server or other computing devices intended by the malicious script (in Step H).

Figure 5:
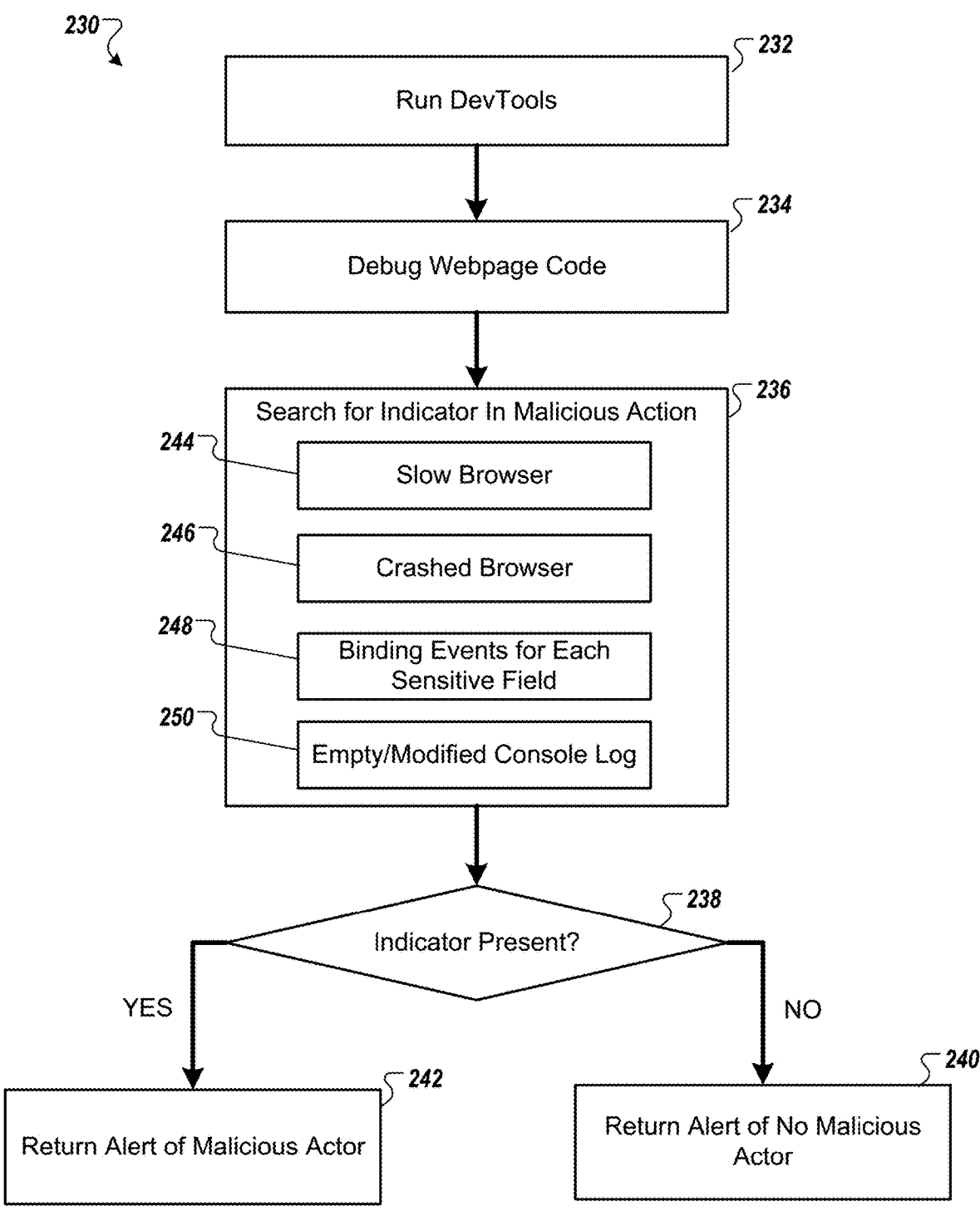
FIG. 5 is a flowchart of an example process for evaluating a website security based on detection of malicious script's observing action.

FIG. 5 is a flowchart of an example process 230 for evaluating a website security based on detection of malicious script's observing action. The process 230 is configured to detect that a malicious script, which has been secretly injected into website code, is observing that the website code is being tested (or the malicious script is being observed) in an attempt to hide its operations from being detected. In some implementations, the process 230 can be at least partially performed against static webpage code. In addition or alternatively, the process 170 can be at least partially performed against a dynamic behavior log as described herein, for example with reference to FIGS. 6-8.

The process 230 can include running one or more development tools, such as the code observation tools 112 (Block 232). The development tools can be built in a browser and opened in the form of a panel within the browser. The development tools can be used to test and debug webpage code including scripts therein (including malicious scripts being injected), and/or inspect network traffic from and into the webpage. For example, the code observation tools 112 can provide a console panel that can be open to permit for a user to view logged messages or run scripts.

The process 230 can include debugging webpage code, such as the code 108 (Block 234). Debugging can be performed using the development tools to locate and fix defects or problems within the webpage code. The process 230 can include searching for one or more indicators that may represent a malicious actor attempting to avoid detection when being observed (Block 236). As described herein, a malicious script may detect ongoing debugging operations, testing, or other code observation activities by looking at pauses and/or other timing anomalies in the execution and/or debugging of the webpage code to which the malicious script code has been injected. The malicious script may use various techniques to detect such ongoing debugging operations, testing, or other code activities, and the process 230 can detect such techniques and identify them as the indicators of malicious action.

For example, the indicators can include indicators of one or more binding events to timing events (Block 244). In addition or alternatively, the indicators can include indicators of accessing event calls for timing-related functions (Block 246). In addition or alternatively, the indicators can include indicators of binding events to start and stop timings (or an interval between) of each of particular operations (Block 248). Further, the indicators can include any combination of these indicators (Block 250). The indicators of malicious action can be identified by static code analysis, and/or by analyzing a dynamic behavior log (as described herein) or other logs (e.g., the console log, etc.).

The malicious actor may affect the operation of the webpage and/or the browser in an attempt to hide its presence in the webpage code, or make it harder to test the webpage code. In one example, if the browser becomes slower than expected, it can be an indicator of presence of a malicious script (Block 244). In another example, unexpected crash of the browser can be an indicator of malicious action (Block 246). In connection to the slower or crashed browser, if one or more, or a predetermined number of, binding events for sensitive fields in the webpage are identified, it can also be an indicator of malicious actor (Block 248). In addition, an empty or modified console log can be an indicator of a malicious actor (Block 250), as described with reference to FIGS. 1-3.

The process 230 can include determining whether the indicator is present (Block 238). If the indicator is not present ("No" in block 238), the process 230 returns an indicator of no malicious actor (e.g., script) (Block 240). Alternatively, the process 230 can simply end without returning any indicator, signal, or the like, if there is no such indicator present. If the indicator is present ("Yes" in block 238), the process 230 returns an indicator of presence of such an indicator of malicious actor (Block 242). This indicator can be provided in various forms, such as an alert, notification, message, etc., and can be transmitted to one or more security analysts via their computing devices. The indicator can be aggregated with other indicators described herein, and the aggregate of indicators can be provided to the security analysts via the computing devices or systems, so that the security analysts can perform further investigation.

Figure 6:
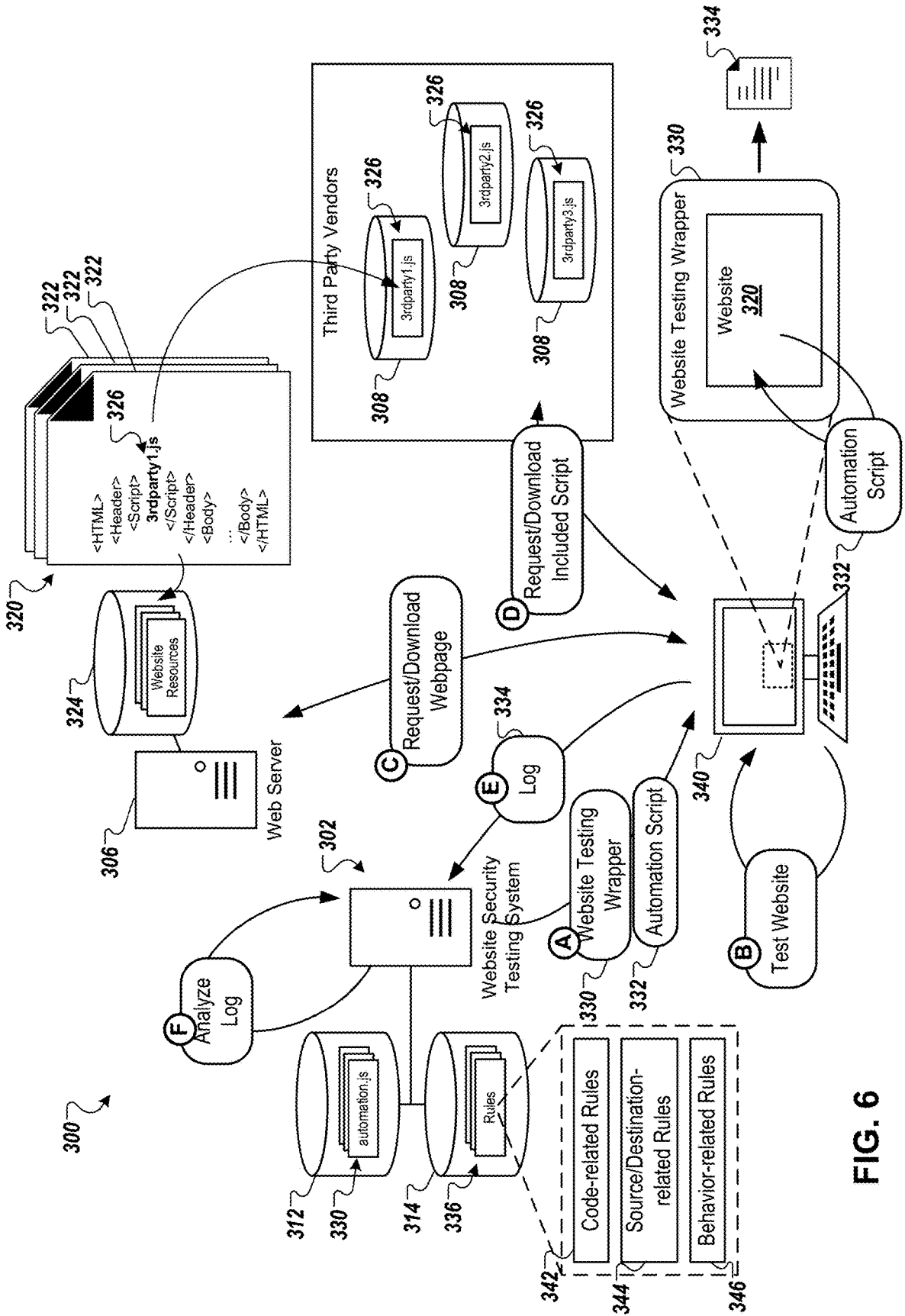
FIG. 6 is a block diagram of an example network architecture for website vulnerability testing.

FIG. 6 is a block diagram of an example network architecture 300 for website vulnerability testing of the present disclosure. The network architecture 300 includes a website security test system 302, a test client device 304, a web server 306, and a third party script server 308. The entities in the network architecture 300, such as the website security test system 302, the test client device 304, the web server

306, and the third party script server 308, are communicatively coupled to one or more networks.

The website security test system 302 stores and manages a website test tool, such as a website testing wrapper 330. The website security test system 302 can transmit the website test tool to the test client device 304 for vulnerability testing as described herein. The website security test system 302 can manage a plurality of automation scripts that are stored in an automation scripts database 312. In addition, the website security test system 302 can manage one or more security testing rules 336 stored in a testing rules database 314. Testing rules can be used to analyze static website code, and/or records of dynamic behavior of websites, and determine malicious code included in the websites.

The test client device 304 is used to access a website (e.g., one or more webpages thereof) from the web server 306 and perform security vulnerability of the website. The test client device 304 can be dedicated for security vulnerability testing for websites. For example, the test client device 304 can be a computing device only for the website security testing described herein, and is not an actual client device in the network (e.g., a network client or host). In alternative implementations, an actual network client device can be used as the test client device 304. The test client device 304 can provide an isolated environment for such testing. The test client device 304 can be a physical computing device, a virtual machine, or any other systems that can provide isolated runtime environments for websites.

The test client device 304 can run a web browser for a user to access the website being tested. In addition or alternatively, the test client device 304 executes a website testing tool (e.g., the website testing wrapper) to perform testing on the website.

The web server 306 operates to host one or more webpages 322 of a website 320. The web server 306 connects to a website resources database 324 storing code (e.g., HTML, scripts (e.g., JavaScript), style sheets, server-side code, client-side code, etc.) that the web server 306 executes and/or distributes to provide the webpages 322 on client devices. The webpages 322 can be considered to collectively be a website 320 that is hosted by the web server 306.

A website is a collection of network web resources, such as static assets (images, fonts, embedded videos, HTML, JavaScript, style-sheets, etc.), and server-side code which are typically identified with a common domain name and published on a web server. A website can be of various types, such as a static website and a dynamic website (also referred to as a web application). A static website has web pages stored on the server in the format that is sent to a client web browser. It may be coded in Hypertext Markup Language (HTML) and Cascading Style Sheets (CSS) used to control appearance beyond basic HTML. Images are commonly used to effect the desired appearance and as part of the main content. Audio or video might also be considered static content if it plays automatically or is generally non-interactive. This type of website usually displays the same information to all visitors. A dynamic website (or a web application) is a website that changes or customizes itself frequently and automatically. Server-side dynamic pages are generated on the fly by computer code that produces the HTML with CSS. There are a wide range of software systems, such as CGI, Java Servlets and Java Server Pages (JSP), Active Server Pages, Node.js, and ColdFusion (CFML), which are available to generate dynamic web systems and dynamic sites.

By way of example, an example of a website to be tested for vulnerability to security attacks may be an online shopping website in which a user connects to the website through a web browser, and save shopping items in a shopping cart, sign in the user's account by entering a username/password combination, and/or check out with payment. The automation script, when executed, can simulate such user interaction with the website.

The third party script server 308 operates to host one or more third party scripts 326 that can be included in a website 320. The third party script server 308 can be separate from the web server 306 and provide scripts to be directly embedded to the website hosted by the web server 306.

Third party scripts 326 are scripts (e.g., JavaScript) that can be embedded into a website directly from third-party vendors. Third party scripts 326 may provide a range of functionalities that make a website more dynamic and interactive, and/or generate a revenue stream. Such scripts can include ads, analytics, widgets and other suitable scripts for other functionalities. Examples of third-party scripts include social sharing buttons (e.g., Twitter, Facebook, G+, etc.), video player embeds (e.g., YouTube, Vimeo, etc.), advertising iframes, analytics & metrics scripts, A/B testing scripts for experiments, helper libraries (e.g., date formatting, animation, functional libraries, etc.).

By way of example, where a website is an online shopping website, many third party scripts, such as login, checkout, payment, and other sensitive processes, can be downloaded and run with the website code. As described herein, such third party scripts can create vulnerabilities in the website, such as when malicious code has been injected into the third party scripts. For example, third party scripts for the payment process can be compromised with malicious code for scraping the user's sensitive data (e.g., credit card information) by logging the user's keystrokes. In addition or alternatively, attackers can create malicious scripts and inject them into the website directly. Malicious code can be embedded in a website in such a way that it looks like part of normal website code. Static code analysis does not identify all such code until it is actually executed on client devices. As described herein, dynamic analysis described herein can monitor and log the behavior of a website with malicious code embedded therein when the website is run through a web browser (and/or the website testing wrapper) on a client device.

Referring still to FIG. 6, an overall process for dynamic testing of website vulnerabilities is described. In Step A, the website security testing system 302 can transmit a website testing wrapper 330 and an automation script 332 to the test client device 304 so that vulnerability testing can be performed for a website 320 that has been identified to be tested for potential security vulnerabilities.

The website testing wrapper 330 is code designed so as to test a website in the test client device 304 with no or little modification of the website code. As described herein, the website testing wrapper 330 can execute the automation script 332 on the website code, and generate a dynamic website log 334 that logs the behavior of the website in response to the automation script.

The automation script 332 is a script that automatically simulates a series of actions or inputs of a user that interacts with a target website. The automation script can include operation of elements of the target website, modification of attributes of the elements, changes to the location of the elements in a document object model (DOM), and any other suitable actions against the target webpage. Such elements can be based on events that result from user interaction with a web browser. In some implementations, the automation script 332 can be derived from a functional test script to test potential vulnerabilities of a website.

The automation script 332, which is suitable for testing the target website 320, can be selected and retrieved from a plurality of automation scripts stored in the database 312. Alternatively, the automation script 332 can be created and/or formatted to be executable with the website 320 on the test client device 304.

In Step B, the test client device 304 operates to test the website 320, which causes the test client device 304 to request and download the webpages (Step C), and further to request and download the third party scripts and resources included in the webpages (Step D).

In Step C, the test client device 304 transmits a request for the website 320 to the web server 306. The web server 306 transmits the requested website 320 to the test client device 304, and the test client device 304 downloads the website code 320 (e.g., webpages 322 thereof) from the web server 306.

In Step D, the test client device 304 transmits a request for the third party scripts 326 included in the webpages 322 to the third party script servers 308, which then transmits the requested third party scripts 326 back to the test client device 304. The test client device 304 downloads the third party scripts 326 from the third party script servers 308.

During the testing process (Step B), the webpages 322 including the third party scripts 326 can be accessed and presented with the website test wrapper 330, which can execute the automation script 332. The automation script 332 provides simulated user inputs to interact with the webpages 322. The website test wrapper 330 can generate a dynamic website log 334 that records all the behavior of the webpages 322 in response to the simulated user inputs provided by the automation script 332.

In Step E, the test client device 304 transmits the log 334 to the website security testing system 302. The log 334 can include various pieces of information indicative of the dynamic behavior of the webpages 322, which includes a functional user flow through the webpages resulting from the simulated user interaction with the webpages 322. For example, the log 334 can include information about function calls, messages, events, network traffic, data packets, cookies, downloads, and other data indicative of the website behavior.

In Step F, the website security testing system 302 can be used to analyze the log 334 to identify any malicious behavior of the website 320. The website security testing system 302 can automatically scan and analyze the log 334, and identify any abnormal or malicious behavior and/or compromised code. Alternatively or in addition, a security administrator (e.g., a security analyst) can manually review the log 334, and identify any abnormal or malicious behavior of the website 320 and/or determine if any of the code has been compromised. In addition to analyzing the log 334, the website security testing system 302 can analyze the code (e.g., static code) of the website 320 (e.g., the code stored in the database 324).

In some implementations, the identification of anomalous behavior and/or compromised scripts can be performed based on one or more testing rules 314. The testing rules 314 can be designed to identify abnormal or suspicious code (e.g., scripts) in a website, and detect behavior of the website that differs from a predetermined sequence of a behavior of a website that interacts with normal user input. In some implementations, the rules 314 include code-related rules 342, source/destination-related rules 344, and behavior-related rules 346. For example, presence of a potentially malicious script can be determined by applying the code-related rules 342 against the code of the website 320, applying the source/destination-related rules 344 against the log 334, and/or applying the behavior-related rules 346 against the log 334.

The code-related rules 342 can be applied against the static code of the website and configured to search for indicators (e.g., strings or code snippets) of malicious actors in the website code. For example, the code-related rules 342 can be used to identify indicators representative of presence of obfuscation techniques, encryption libraries, masking techniques (e.g., jQuery Mask), and sensitive information requests in the website code.

The source/destination-related rules 344 can be applied against the log 334 and configured to search for known bad actors and/or unknown actors that interact with the website in network traffic recorded in the log 334. Presence of known bad actors or unknown actors can be used as indicators for presence of malicious scripts, for which further investigation may be needed.

The behavior-related rules 346 can be applied against the log 334 and configured to search for indicators that can represent whether sensitive information (e.g., payment data, credentials, etc.) is requested and transmitted outside the website (e.g., to bad domains), whether content security policies (e.g., security policies implemented in browsers) are bypassed, whether information entered in sensitive information fields is intercepted, and/or whether code behavior is modified in the website when the website is being observed. Presence of such indicators identified from the log 334 can be used as indicators for presence of malicious code, for which further investigation may be needed.

Figure 7:
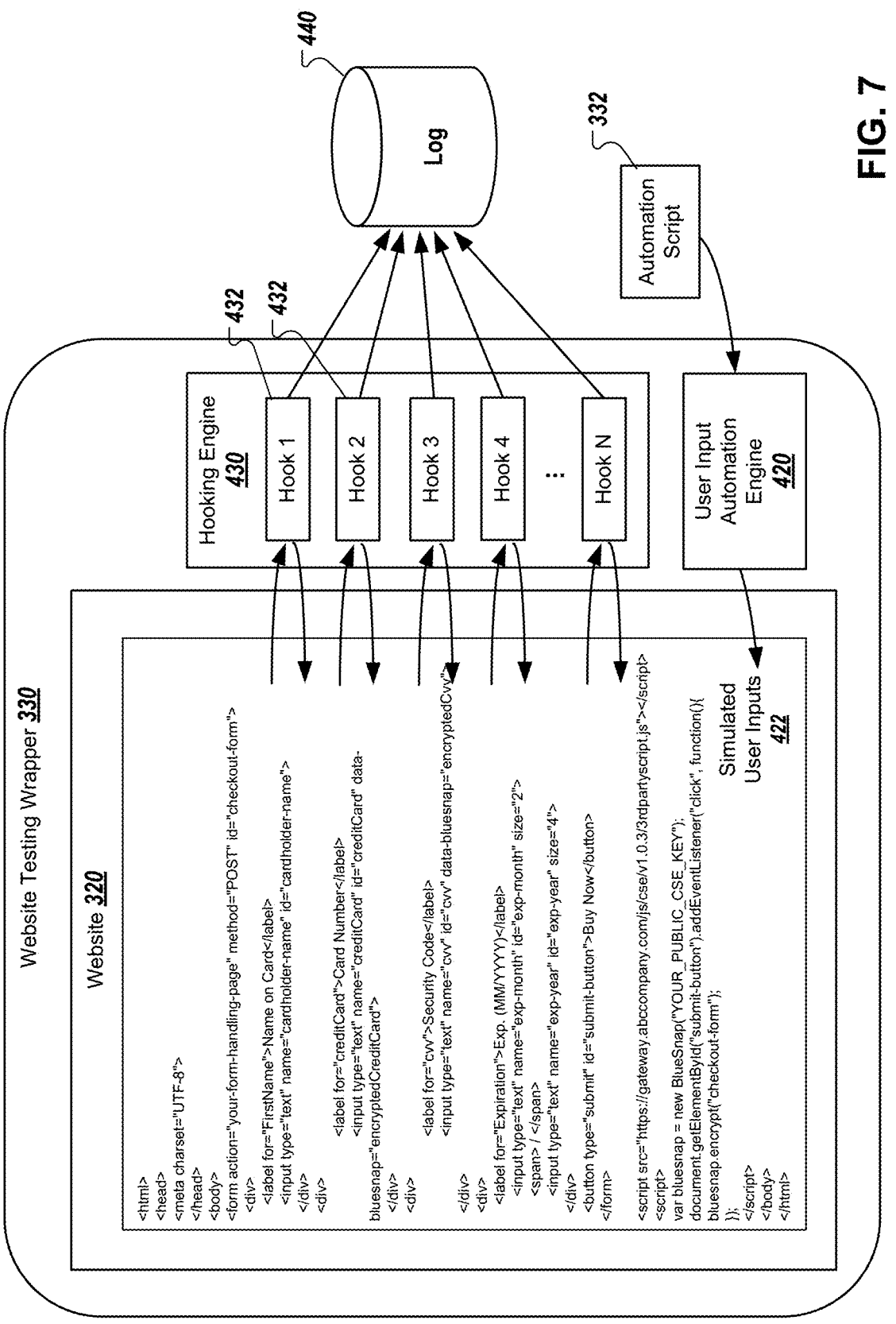
FIG. 7 illustrates an example method of performing dynamic security test of a webpage.

FIG. 7 illustrates an example method 400 of performing dynamic security test of a webpage 410. A webpage 410 can be one of the webpages 322 of the website 320 described in FIG. 6. The webpage 410 can be retrieved from a web server (e.g., the web server 306) and tested in the website testing wrapper 330.

The website testing wrapper 330 can include a user input automation engine 420 configured to simulate user inputs to the webpage 410. For example, the user input automation engine 420 can generate simulated user inputs 422 based on the automation script 332, and enable the simulated user inputs 422 to interact with the webpage 410.

The website testing wrapper 330 can monitor the dynamic behavior of the webpage 410. The dynamic behavior of the webpage 410 can include information indicative of a functional flow in response to the simulated user inputs 422. In some implementations, the website testing wrapper 330 can include a hooking engine 430 configured to monitor the behavior of the webpage being tested. For example, the hooking engine 430 is configured to intercept various operations performed in runtime of the webpage, which can include functional aspects of the webpage, such as function calls, messages, events, etc. that occur in the runtime of the webpage. The hooking engine 430 includes one or more hooks 432. Hooks 432 are code that handle such interceptions (e.g., function calls, messages, events, etc.).

The hooking engine 430 of the website testing wrapper 330 can generate log data 440 that records the behavior of the webpage 410. The log data 440 can be the dynamic website log 334 in FIG. 6. The log data 440 can be used to identify any anomalies in the behavior of the webpage that may result from malicious code embedded in the webpage.

Figure 8:
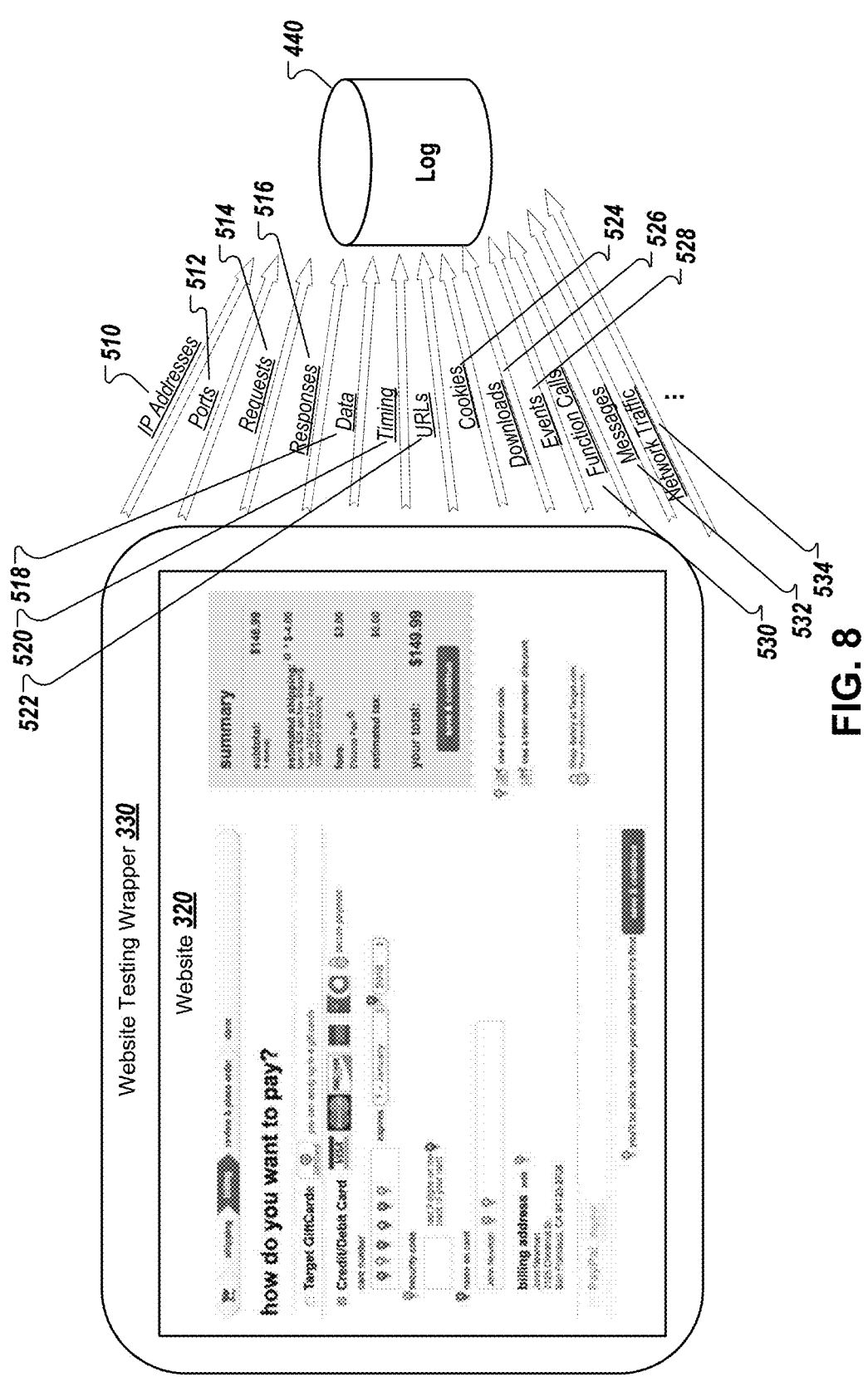
FIG. 8 illustrates example attributes that represent the dynamic behavior of a webpage being tested and is recorded as log data.

FIG. 8 illustrates example attributes that represent the dynamic behavior of a webpage being tested, and is recorded as log data 440. The log data 440 can be used as a source to identify any anomalies in the behavior of the website that can result from malicious third party scripts on the website. The log data 440 can be used to generate a report with which security administrators (e.g., security analysts) can further investigate and mitigate security issues on the website.

Various attributes can be obtained from the runtime test of the website described herein. Examples of such information include IP addresses 510 being redirected, ports 512 accessed, ongoing requests 514, server responses 516, data packets 518 being transmitted, timing 520 of the transmission, URLs 522 of various resources to/from which requests/responses/data are transmitted, cookies 524, and downloads 526, other events 528 occurring as a result of executing the website, function calls 530, messages 532, network traffic 534, and other pieces of information are monitored during the runtime test of the website.

Network traffic can be monitored by measuring various attributes of the data streams, such as amount of traffic, type of traffic (e.g., web traffic, mail traffic, file transfer traffic, infrastructure traffic, remote control traffic, etc.), IP addresses (e.g., IP addresses of network devices, servers, clients, applications, etc.), ports accessed, protocols, bandwidth, etc. A packet sniffer can help with analysis of network traffic by intercepting and logging traffic passing over a network by capturing each packet.

A data packet is a formatted unit of data being transmitted to a network. A data packet includes payload and control information which provides data (e.g., source and destination network addresses, error detection codes, and sequencing information) for delivering the payload. Control information can be found in packet headers and trailers.

A cookie is a small piece of data sent from the website and stored on a user's computing device (e.g., the test client device) by the web browser while the user is browsing. Cookies are designed to allow websites to remember stateful information (e.g., items added in the shopping cart in an online store) and/or to record the user's browsing activity (e.g., clicking buttons, logging in, recording visited pages, etc.). Cookies can further be used to record arbitrary pieces of information that the user has previously entered into form fields, such as names, addresses, passwords, and credit card numbers.

Cookies exist in various types, such as session cookies, persistent cookies, secure cookies, http-only cookies, same-site cookies, third-party cookies, supercookies, etc. Further, authentication cookies are cookies used by web servers to know whether the user is logged in or not, and which account they are logged in with. Authentication cookies allow the site to know whether to send a page containing sensitive information, or require the user to authenticate themselves by logging in. The security of an authentication cookie generally depends on the security of the issuing website and the user's web browser, and on whether the cookie data is encrypted. Security vulnerabilities may allow cookie's data to be read by a hacker, used to gain access to user data, or used to gain access (with the user's credentials) to the website to which the cookie belongs. Tracking cookies, such as third-party tracking cookies, are used as ways to compile long-term records of individuals' browsing histories.

Messages can include inputs generated by a system (e.g., an operating system on the test client device 304) and applications (e.g., a web browser launching the website being tested). A system can also generate messages in response to changes in the system brought about by an application. Further, a system can use messages to control the operations of applications and to provide input and other information for applications to process. An application can generate messages to perform tasks or communicate with other applications.

An event is an action or occurrence that may originate asynchronously from an external activity that needs to be handled by a program. An event is an entity which encapsulates the action and the contextual variables triggering the action. Events can be generated or triggered by a system, by a user, or in other ways. Events can be handled synchronously with a program flow. For example, the software may have one or more dedicated places where events are handled. A source of events (e.g., external activity) includes a user who may interact with the software by way of, for example, keystrokes on the keyboard. Another source is a hardware device such as a timer. Software can also trigger its own set of events into the event loop to, for example, communicate the completion of a task.

The events include user generated events, such as mouse events, keyboard events, joystick events, touchscreen events, and device events. For example, a pointing device can generate software recognizable pointing device gestures. A mouse can generate a number of mouse events, such as mouse move (e.g., direction of move and distance), mouse button controls, mouse wheel motion, or any combination thereof. Further, pressing a key, or a combination of multiple keys, on a keyboard generates a keyboard event which causes a currently running program to respond to data introduced by the keystroke. Moving a joystick generates an X-Y analogue signal which generates a joystick event. A joystick can have one or more buttons which also generate an event when pressed. A user interaction with a touchscreen can generate events which are referred to as touch events or gestures. Action by or to a device, such as a shake, tilt, rotation, move, etc., can generate device events.

Figure 9A:
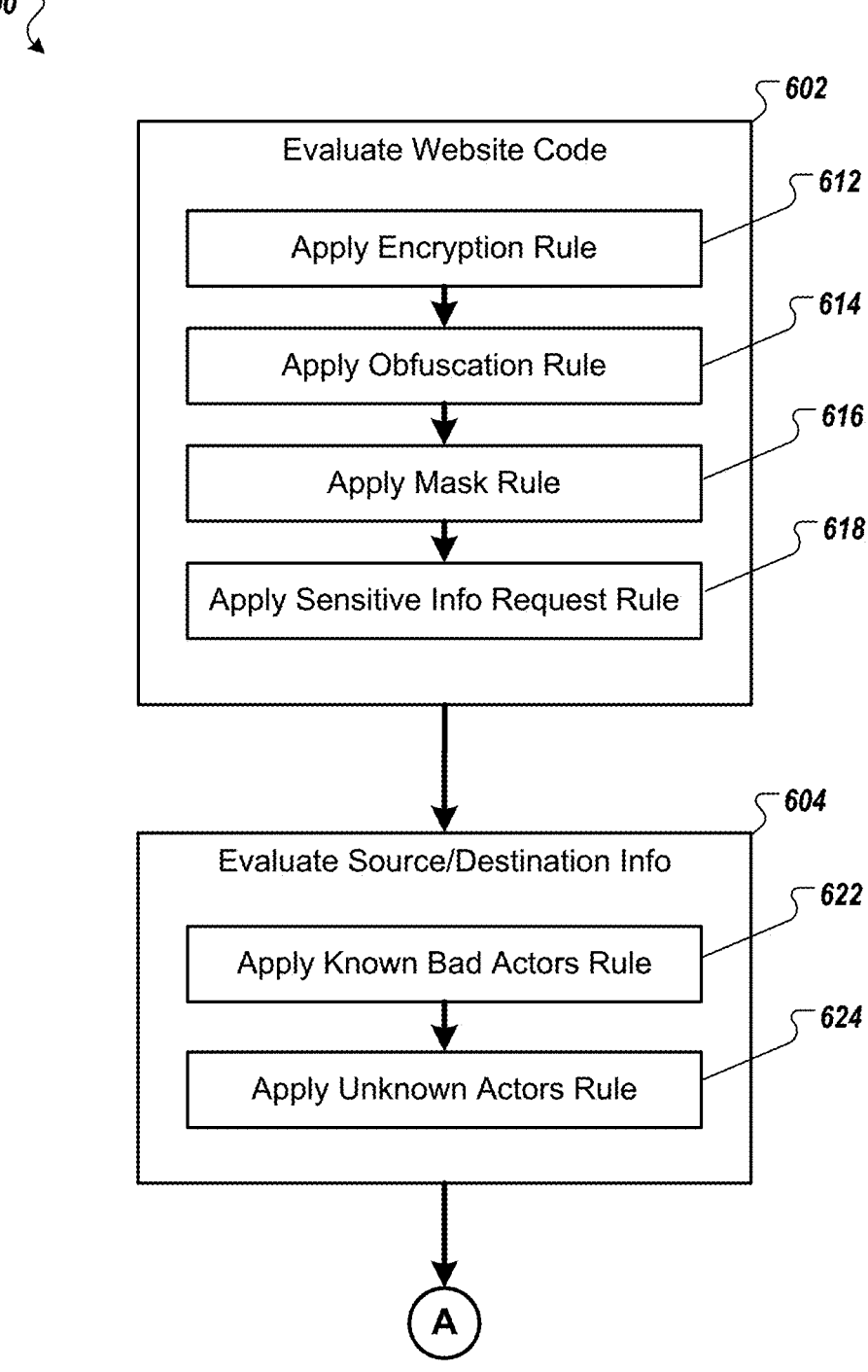
FIGS. 9A-B is a flowchart of an example process for identifying presence of a potentially-malicious script in a website.
Figure 9B:
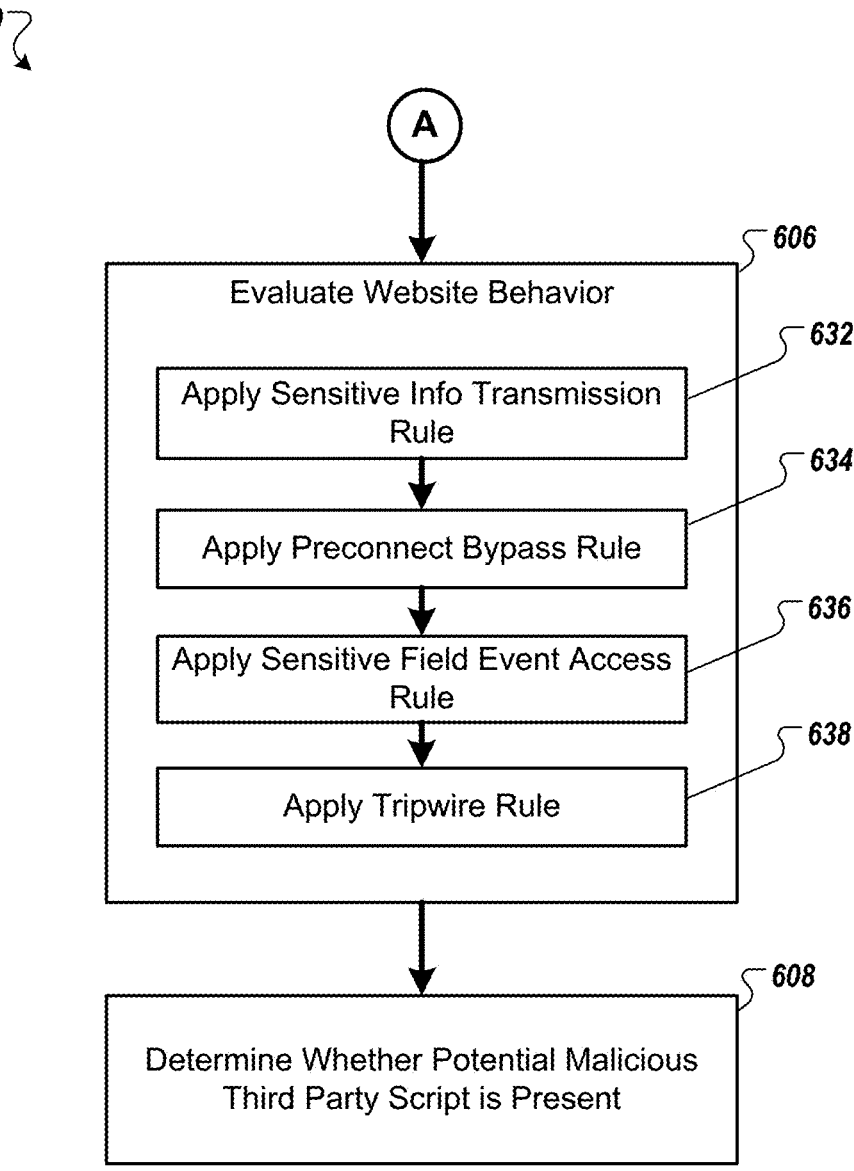

FIGS. 9A-B is a flowchart of an example process 600 for identifying presence of potentially malicious code in a website. For example, the process 600 includes evaluating website code (602), evaluating source/destination information (604), evaluating website behavior (606), and determining whether malicious code it potentially present in the website (608).

Evaluating website code (602) can be performed by monitoring the website code itself. Evaluating website code (602) can include applying one or more rules against the website code to identify any indicators (e.g., strings, code snippets, etc.) that may represent abnormal, suspicious, or malicious actors (e.g., scripts, domains, etc.). For example, the website code can be evaluated to determine that the website code includes one or more known malicious code snippets, which have been typically shown in known malicious code and designed to hide their behavior, such as heavy obfuscation or malicious code that have been known by digital schemers.

In some implementations, evaluating website code (602) can include applying an encryption rule against the website code (612). The encryption rule can be configured to identify indicators for presence of encrypted code or script-based encryption libraries in the website code. Because a website typically has all the code and traffic encrypted and does not use such encryption libraries, presence of encrypted code or script-based encryption libraries may be a strong indicator of presence of malicious script in the website.

In addition or alternatively, evaluating website code (602) can include applying an obfuscation rule against the website code (614). The obfuscation rule can be configured to identify indicators for presence of obfuscation and/or obfuscation type in the website code. Because a website typically uses little obfuscation, the presence of obfuscation may be a strong indicator of presence of malicious script in the website.

In addition or alternatively, evaluating website code (602) can include applying a mask rule against the website code (616). The mask rule can be configured to identify indicators of presence of masks on form fields or other elements that originate from outside the website.

In addition or alternatively, evaluating website code (602) can include applying a sensitive information request rule (618). The sensitive information request rule can be configured to determine whether an outgoing request exists in the website code which attempts to transmit sensitive information to a domain that is outside the website or a domain that is suspicious.

Evaluating the source/destination information (604) can be performed by monitoring network traffic going out and coming into the website. Evaluating the source/destination information (604) can include applying one or more rules against a dynamic behavior log that records the website behavior (e.g., the log 134, 240 herein) to identify any abnormal, suspicious, or malicious network traffic.

In some implementations, evaluating the source/destination information (604) can include applying a known bad actors rule against the website behavior log (e.g., the log 134, 240 herein) (622). The known back actors rule can be configured to search for known bad actors identified in the website behavior log. The known bad actors can include domains that are observed to have been used for malicious activities, or domains that are likely used for particular malicious activities.

In addition or alternatively, evaluating the source/destination information (604) can include applying an unknown actors rule against the website behavior log (e.g., the log 134, 240 herein) (624). The unknown actors rule can be configured to search for unknown actors identified in the website behavior log. The unknown actors can include domains that have never been observed or known in general or by a particular group of security analysts or other users.

Evaluating website behavior (606) can be performed by monitoring website behavior in runtime. Evaluating website behavior (606) can include applying one or more rules against a dynamic behavior log that records the website behavior (e.g., the log 134, 240 herein) to identify any abnormal, suspicious, or malicious behavior of the website.

In some implementations, evaluating website behavior (606) can include applying a sensitive information transmission rule against the website behavior log (e.g., the log 134, 240 herein) (632). The sensitive information transmission rule can be designed to monitor outgoing network traffic and determine if there are requests in the outgoing network traffic that contain sensitive information and are transmitted to a domain that is not the website or otherwise suspicious.

In addition or alternatively, evaluating website behavior (606) can include applying a preconnect bypass rule against the website behavior log (e.g., the log 134, 240 herein) (634). The preconnect bypass rule can be designed to detect an activity or attempt to preconnect being used to bypass a security policy executed in a browser and connect to a malicious server.

In addition or alternatively, evaluating website behavior (606) can include applying a sensitive field event access rule against the website behavior log (e.g., the log 134, 240 herein) (636). The sensitive field event access rule can be designed to detect any code that binds to an event (e.g., a checkout button) for fields configured to receive user inputs of sensitive information (e.g., credit card information).

In addition or alternatively, evaluating website behavior (606) can include applying a script modification rule against the website behavior log (e.g., the log 134, 240 herein) (638). The script modification rule can be designed to monitor indicators of script behavior modification in a website when the website is being observed, as described herein, for example with reference to FIGS. 1-5.

Referring still to FIG. 9, when the website code, the source/destination information, and/or the website behavior are evaluated, the process 600 includes determining whether a potentially malicious script (e.g., a third party script) is present (608) based on the evaluation. As described herein, the process 600 can generate an alert (e.g., message) for each of the rules being applied. For example, each of the rules described herein can be applied against static website code or dynamic behavior logs, and if the system determines that the evaluation based on that rule turns out to be positive, the system can generate (e.g., return) an alert (e.g., message) of presence of a potential malicious script in the website. Such an alert can be generated with respect to each of the rules being applied. In addition, for each rule being applied, one or more alerts can be generated depending on the number of positive instances identified based on the rule being applied. In some implementations, the alerts can be aggregated after all or some of the rules that are available have been applied. The number of alerts can be correlated with the likelihood of a malicious script being present in the website. In general, an increasing number of alerts being generated can indicate a more likelihood that a malicious script is present in the website, and further security investigation (by security analysts or by automated systems) may be warranted.

In some implementations, the rules described herein (e.g., in FIGS. 9A-B) can be used all together to evaluate the website security. Alternatively, some of the rules can be selected for desired purposes or according to a desired level of evaluation of a particular website, and only a combination of the selected rules can be applied against the website code and/or the dynamic behavior log created during the test. Alternatively, the rules can be individually and/or selectively applicable for a security test of a particular website.

Figure 10:
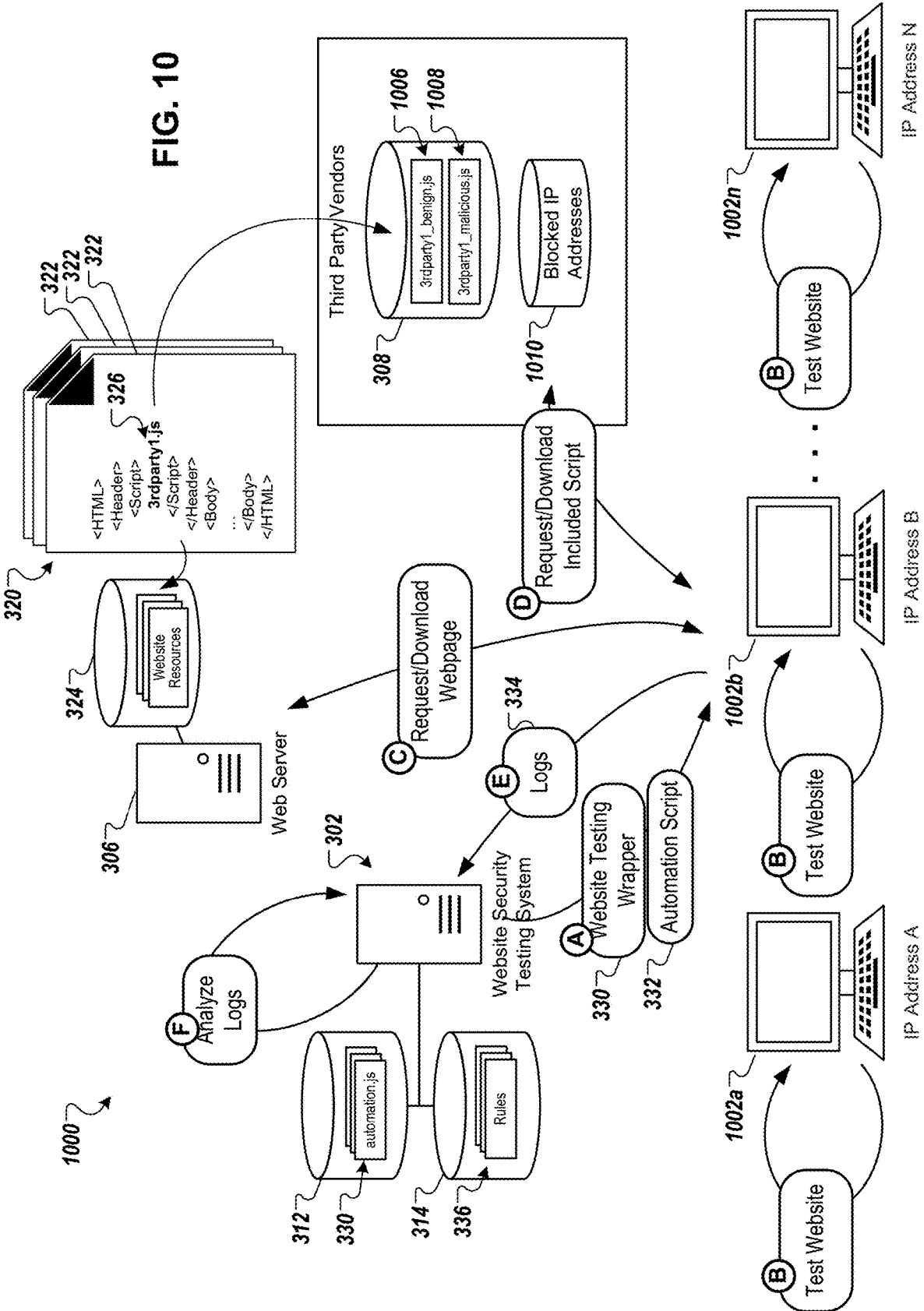
FIG. 10 is a block diagram of an example network architecture for website vulnerability testing of the present disclosure.

FIG. 10 is a block diagram of an example network architecture 1000 for website vulnerability testing of the present disclosure. The network architecture 1000 is similar to the architecture 300 described above with regard to FIG. 6, and includes the website security test system 302, a test client device 1002, the web server 306, and the third party script server 308. In the example network architecture, though, there are multiple client test devices 1002a-n which are each associated with a different IP address (i.e., IP address A, IP address B, and IP address N). The client devices 1002a-n can each be the same as the test client device 304 and can each perform website testing as described above. Additionally, the architecture 1000 can perform effectively the same operations A-F among the website security test system 302, the test client devices 1002a-n (which can each behave independently like the client test device 304), the web server 306, and the third party script server 308.

The architecture 1000 is configured to permit for testing to be performed in a manner the can circumvent attempts by third party script servers 308 to try to avoid detection by serving only benign code to IP addresses of client devices that the third party script servers 308 may suspect as attempting to detect malicious code. For example, third party script servers 308 can include a database 1010 of blocked IP addresses (and/or other network/device identifiers, such as domain name, MAC address) that the third party script server 308 suspects of potentially attempting to detect and thwart malicious behavior. Such a database 1010 may be generated by a third party script server 308 in a variety of ways, for example, if script transmitted to a client device detects the presence of a debugger and/or log file manipulation, the script may send a notification back to the server indicating that there are detection efforts underway on the client device along with the IP address of the client device, which can be added to the blocked database 1010. Going forward, when requests from that client device are received by the third party script server 308, it may cross-reference the requesting IP address of the client device against the database 1010. If the IP address of the requesting device is included in the database 1010, then the third party server 308 can send a benign version of the script 1006 to the client device, which may remove some or all of the malicious features that would trigger the rules described throughout this document and, thus, avoid detection of the third party server 308 as a malicious or bad actor. In contrast, if the IP address of the requesting device is not included in the database 1010, then the third party server 308 can send a malicious version of the script 1008 that include one or more of the malicious features that are being detected by the website security testing system 302. If the IP address of the client device remains constant and is, at some point, added to the IP address database 1010, which may be shared among malicious script providers, it may result in benign scripts 1006 being sent to the testing client device, whereas other client devices from other IP addresses, such as end users of the website 306, would receive the malicious script 1008 without detection by the security testing system 302.

To overcome and resolve this potential issue, the website security system 302 can leverage testing across multiple client device 1002a-n that are each associated with and that are transmitting requests from different IP addresses A-N. These different client devices 1002a-n may be accomplished by the website security testing system 302 in any of a variety of ways, such as through using mechanisms to tunnel IP connections from the client devices 1002a-n to having a different IP endpoint (e.g., through proxies and/or virtual private network (VPN) connections), through spinning up instances of the client devices 1002a-n on various servers and/or computing systems located throughout the world, and/or other techniques. The website security system 302 may simply alternate between the different client devices 1002a-n for performing each test to provide variation in the IP address from which requests are received, such as changing to use a different IP address for each request, for each day, for each week, and/or other duration. By varying the IP address from which requests are provided to the third party script servers 308 through the multiple client devices 1002a-n, the website security testing system 302 can ensure that its attempts to detect the malicious script 1008 are not thwarted by the third party servers 308 blocking IP addresses using the database 1010.

Additionally and/or alternatively, the website security system 302 may perform testing in parallel across multiple of the client devices 1002a-n such that multiple instances of the same or highly similar test are performed at or around the same time from multiple different IP addresses. The results of such parallel testing can be compared by the website security testing system 302 to infer whether and which third party servers 308 may have flagged an IP address of one or more of the client devices 1002a-n for inclusion in the database 1010, which can itself be used to determine whether a third party server 308 should be added to the website security testing systems 302 blacklist of malicious actors. For example, if both the client device 1002a and the client device 1002b perform the same automated test at or around the same time, but the client device 1002a receives the benign script 1006 (i.e., IP address A previously added to database 1010) while the client device 1002b receives the malicious script 1008 (i.e., IP address B not previously added to database 1010), then the website security testing system 302 can compare the scripts to determine that the third party server 308 is likely a malicious actor even if the malicious script 1008 may attempt to modify its behavior to avoid detection on the client device 1002b.

Figure 11:
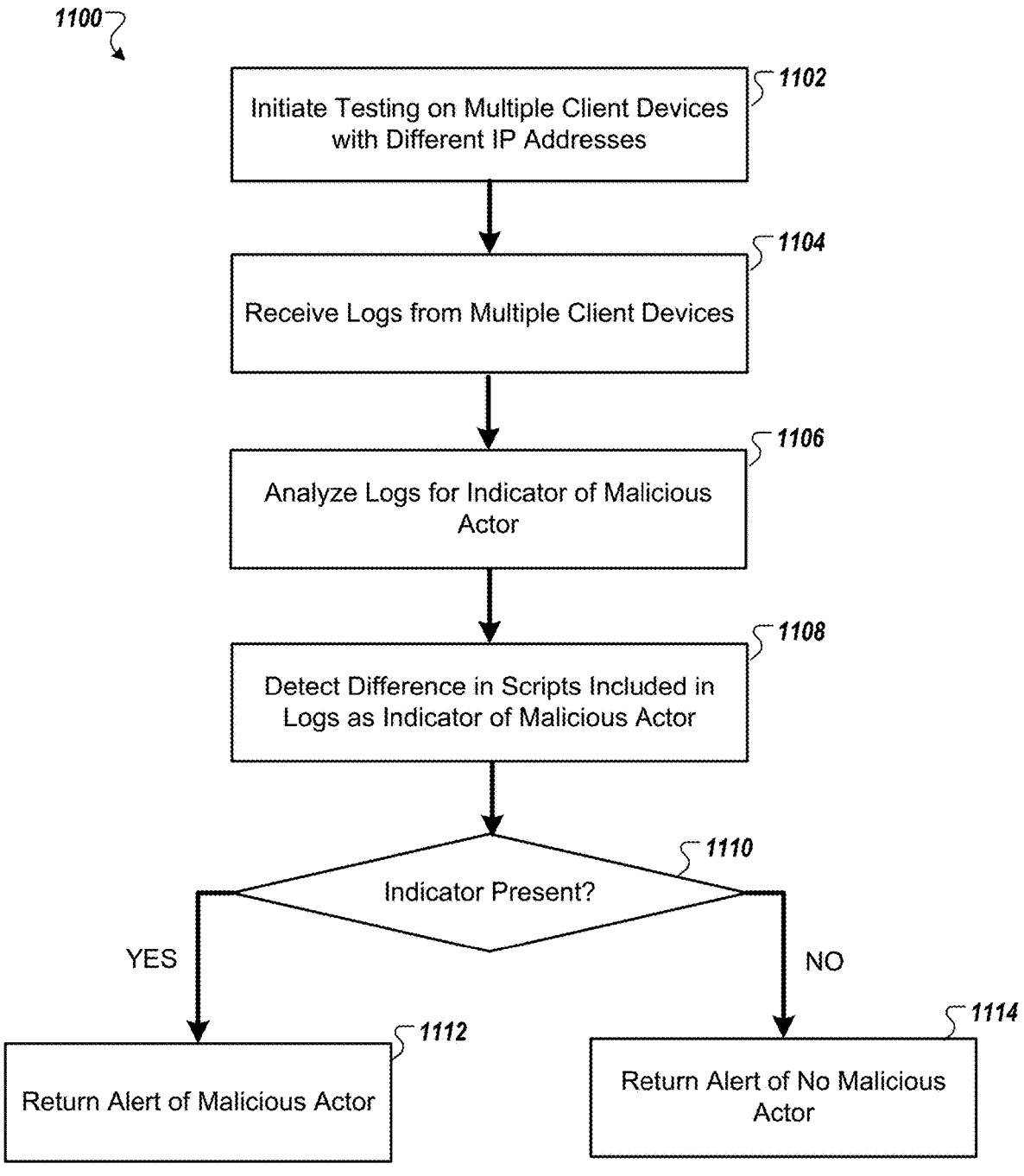
FIG. 11 illustrates an example technique for performing website testing across multiple different client devices.

FIG. 11 illustrates an example technique 1100 for performing website testing across multiple different client devices. The example technique 1100 can be performed by any of the testing systems described throughout this document, such as the website security testing system 302 included in the architecture 1000 described above with regard to FIG. 10.

The website security testing system can initiate testing across multiple client device that each have a different IP address (Block 1102). For example, the website security testing system 302 can transmit the same website testing wrapper 330 and automation script 332 to the client devices 1002a and 1002b. This can cause the client device 1002a and 1002b to perform the same website testing from different IP addresses (IP address A and IP address B), which may result in different scripts being received and processed from the third party script server 308 depending on, for example, whether either of the IP addresses is included in the database 1010.

The website security testing system can receive the logs from the multiple client devices (Block 1104). As described above, the logs can include dynamic operations performed by the devices, as well as the actual script files that were downloaded by the devices. For example, the client devices 1002a and 1002b can transmit the logs to the website security testing system 302. The website security testing system can then analyze the logs for indicators of malicious actors (Block 1106), using any of the techniques described throughout this document. Any of the rules 336 being triggered can be an indicator of a malicious actor, for example. The website security testing system can also compare the scripts that were downloaded by the client devices (Block 1108). For example, the website security testing system 302 can compare the static scripts that were downloaded and differences between the downloaded scripts can be an indicator of a malicious actor. Such a comparison may trigger based on a single difference in the script, and/or may require a threshold difference (e.g., more than 5% of the code is different, more than 10% of the code is different). The website security testing system 302 may also compare the dynamic logs for various scripts to determine whether the client devices were somehow directed to perform different actions even though they were performing the same test. Again, any difference may be an indicator of a malicious actor and/or there may be a threshold difference that is required to identify an actor as malicious (e.g., more than 5% of the dynamic operations are different, more than 10% of the dynamic operations are different).

If an indicator is present as determined by Block 1106 and/or Block 1108 (Block 1110), then an alert of a malicious actor can be returned (Block 1112). Otherwise, information indicating that no malicious actor is present can be returned (Block 1114). The Blocks 1112 and 1114 can be similar to the other return operations described above, for example, with regard to FIG. 3.

Figure 12:
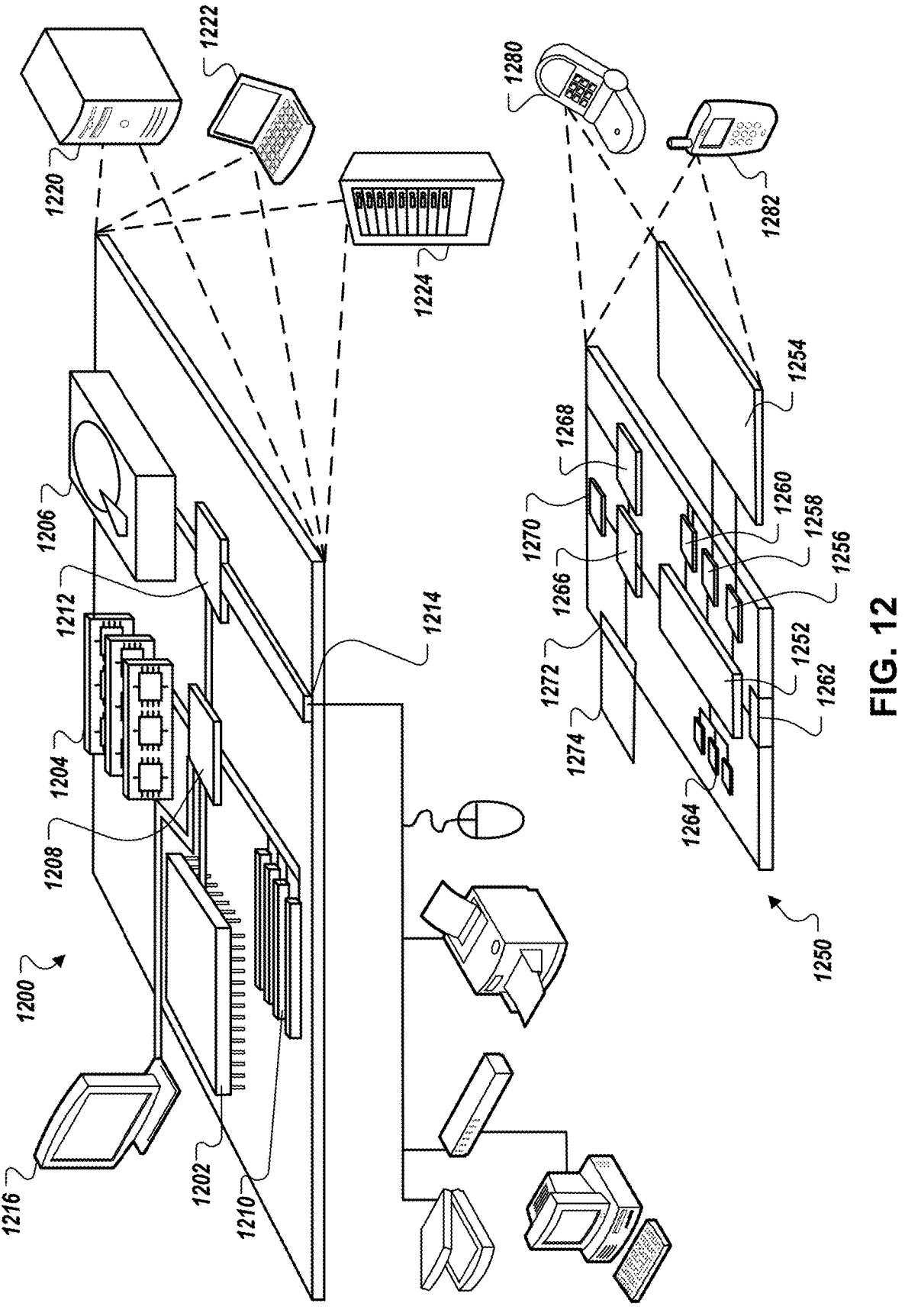
FIG. 12 is a block diagram of computing devices that may be used to implement the systems and methods described in this document, as either a client or as a server or plurality of servers.

FIG. 12 is a block diagram of computing devices 1200, 1250 that may be used to implement the systems and methods described in this document, as either a client or as a server or plurality of servers. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high-speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high-speed controller 1208 manages bandwidth-intensive operations for the computing device 1200, while the low speed controller 1212 manages lower bandwidth-intensive operations. Such allocation of functions is an example only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT (Thin-Film-Transistor Liquid Crystal Display) display or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may be provided, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252 that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Additionally computing device 1200 or 1250 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for testing a website vulnerability, the method comprising:

retrieving website code of a website, the website code including a script;

debugging the website code;

searching for an indicator of malicious action during the debugging, wherein searching for the indicator of malicious action during the debugging comprises identifying that one or more messages are modified in a console log;

determining presence of a potential malicious script based on the indicator; and returning an alert of the presence of the potential malicious script in the website.

2. The method of claim 1, wherein retrieving the website code includes retrieving the website code on a browser, the method further comprising:

running a code evaluation tool on the browser.

3. The method of claim 1, wherein the indicator is indicative of binding events to timing events.

4. The method of claim 1, wherein the indicator is indicative of accessing event calls for timing-related functions.

5. The method of claim 1, wherein the indicator is indicative of binding events to start and stop timings of an operation.

6. The method of claim 1, wherein based on retrieving the website code of the website, the method further comprises:

simulating a functional user flow on the website;

recording dynamic behavior of the website during simulation of the functional user flow;

retrieving malicious actor detection rules;

applying the retrieved rules to the recorded dynamic behavior of the website; and detecting, based on applying the retrieved rules, the presence of the potential malicious script in the website.

7. The method of claim 6, wherein simulating the functional user flow on the website comprises:

applying a website test wrapper to the website code including the script; and automatically executing, based on applying the wrapper to the website code including the script, an automation script that provides simulated user inputs to interact with the website.

8. The method of claim 7, further comprising:

generating, by the wrapper, a dynamic website log that records behavior of the website in response to the simulated user inputs provided by the automation script.

9. The method of claim 1, wherein searching for the indicator of malicious action during the debugging comprises detecting that a browser for the website is operating slower than an expected speed.

10. The method of claim 1, wherein searching for the indicator of malicious action during the debugging comprises detecting an unexpected crash of a browser for the website.

11. The method of claim 1, further comprising:

aggregating the indicator with a plurality of indicators; and transmitting the aggregated indicators to a computing device of a security analyst.

12. A client computing device for testing a website vulnerability, comprising:

a data processing apparatus; and a memory device storing instructions that when executed by the data processing apparatus cause the client computing device to perform operations comprising:

retrieving website code of a website on a browser, the website code including a script;

running a code evaluation tool on the browser;

debugging the website code;

searching for an indicator of malicious action during the debugging;

determining presence of a potential malicious script based on the indicator; and returning an alert of the presence of the potential malicious script in the website.

13. The client computing device of claim 12, wherein the indicator is indicative of at least one of:

binding events to timing events;

accessing event calls for timing-related functions; or binding events to start and stop timings of an operation.

14. The client computing device of claim 12, wherein searching for the indicator of malicious action during the debugging comprises identifying that one or more messages are removed from a console log.

15. The client computing device of claim 12, wherein based on retrieving the website code of the website, the operations further comprising:

simulating a functional user flow on the website;

recording dynamic behavior of the website during simulation of the functional user flow;

retrieving malicious actor detection rules;

applying the retrieved rules to the recorded dynamic behavior of the website; and detecting, based on applying the retrieved rules, the presence of the potential malicious script in the website.

16. The client computing device of claim 15, wherein simulating the functional user flow on the website comprises:

applying a website test wrapper to the website code including the script; and automatically executing, based on applying the wrapper to the website code including the script, an automation script that provides simulated user inputs to interact with the website.

17. The client computing device of claim 16, the operations further comprising:

generating, by the wrapper, a dynamic website log that records behavior of the website in response to the simulated user inputs provided by the automation script.

18. A method for testing a website vulnerability, the method comprising:

retrieving website code of a website, the website code including a script;

debugging the website code;

searching for an indicator of malicious action during the debugging, wherein searching for the indicator of malicious action during the debugging comprises identifying that one or more messages are removed in a console log;

determining presence of a potential malicious script based on the indicator; and returning an alert of the presence of the potential malicious script in the website.

19. The method of claim 18, wherein the indicator is indicative of at least one of:

binding events to timing events;

accessing event calls for timing-related functions; or binding events to start and stop timings of an operation.

20. The method of claim 18, wherein retrieving the website code includes retrieving the website code on a browser, the method further comprising:

running a code evaluation tool on the browser.

* * * * *